United States Patent [19]
Shiragaki et al.

[11] Patent Number: 6,115,517
[45] Date of Patent: Sep. 5, 2000

[54] OPTICAL COMMUNICATION NETWORK APPARATUS AND OPTICAL SWITCHING NETWORK

[75] Inventors: Tatsuya Shiragaki; Naoya Henmi, both of Tokyo, Japan

[73] Assignee: NEC Corporation, Tokyo, Japan

[21] Appl. No.: 09/111,399

[22] Filed: Jul. 7, 1998

[30]  Foreign Application Priority Data

Jul. 7, 1997 [JP] Japan ................................. 9-181427

[51] Int. Cl.[7] .............................. G02B 6/28; H04J 14/02
[52] U.S. Cl. ................................ 385/24; 385/16; 359/128
[58] Field of Search ................................ 385/24, 16, 17; 359/127, 128, 130

[56]  References Cited

U.S. PATENT DOCUMENTS 5,144,465   9/1992   Smith ..................................... 359/128

FOREIGN PATENT DOCUMENTS

| 3-219793 | 9/1991 | Japan . |
|---|---|---|
| 6303656 | 10/1994 | Japan . |
| 8172649 | 7/1996 | Japan . |
| 9-224268 | 8/1997 | Japan . |

OTHER PUBLICATIONS

Japanese Office Action issued Oct. 6, 1999 in a related application.

Translation of relevant portions of Oct. 6, 1999 Japanese Office Action.

*Primary Examiner*—Jon Henry
*Attorney, Agent, or Firm*—Ostrolenk, Faber, Gerb & Soffen, LLP

[57]  ABSTRACT

An optical communication network node apparatus including input terminals 111 to 11n, *1:2 optical branch units* 121 to 12n, a pass-through optical switching network d101, 2:1 optical connectors 151 to 15n, output terminals 171 to 17n, a drop optical switching network 102, output interfaces 13-1 to 13-mn, input interfaces 14-1 to 14-mn and an insert optical switching network. Accordingly, in the optical communication network node apparatus, various types of optical switching networks are separated from one another and each optical switching network supports only a necessary switching state, so that the number of optical switch elements can be reduced.

12 Claims, 15 Drawing Sheets

F I G. 4
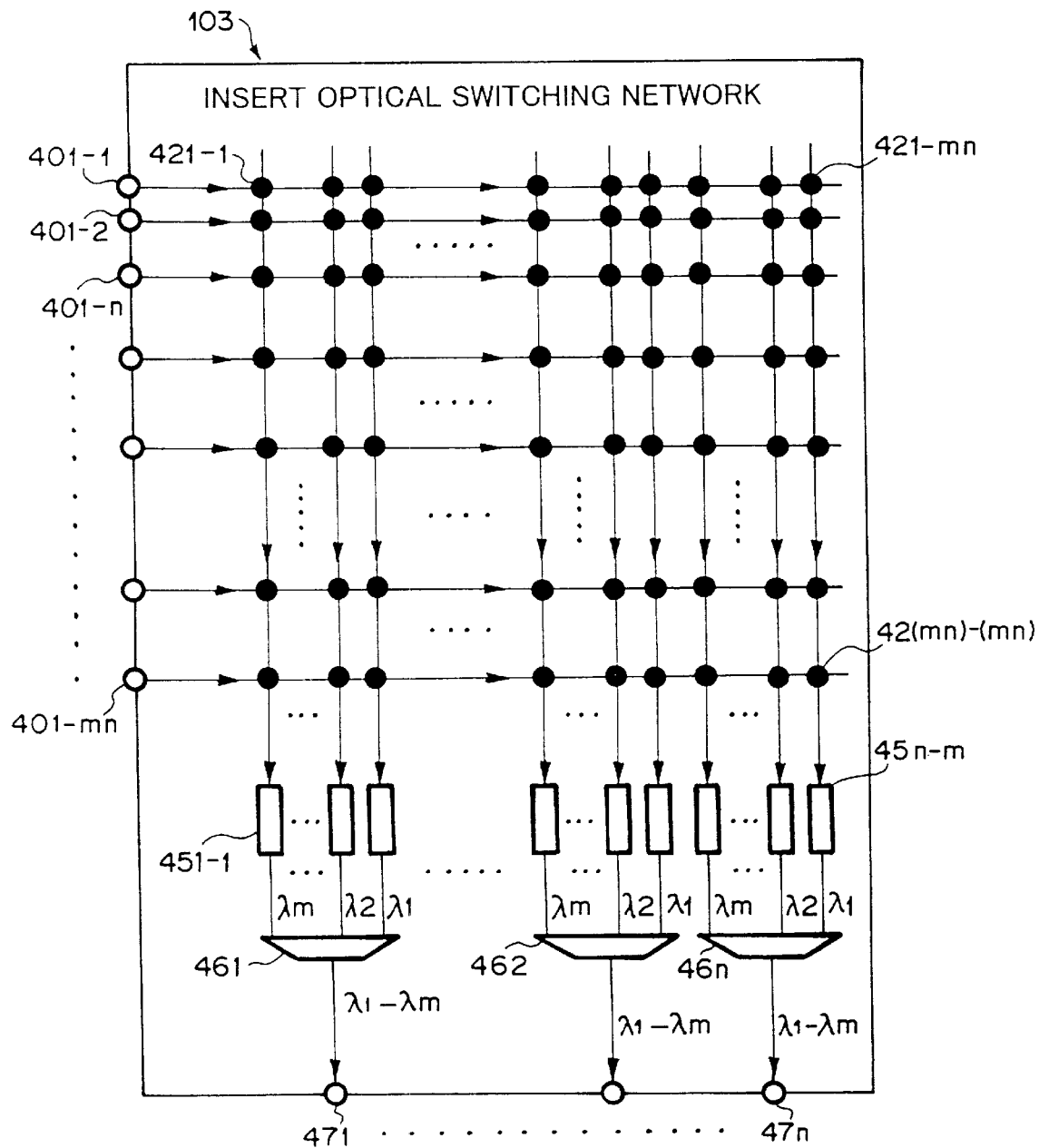

F I G. 6
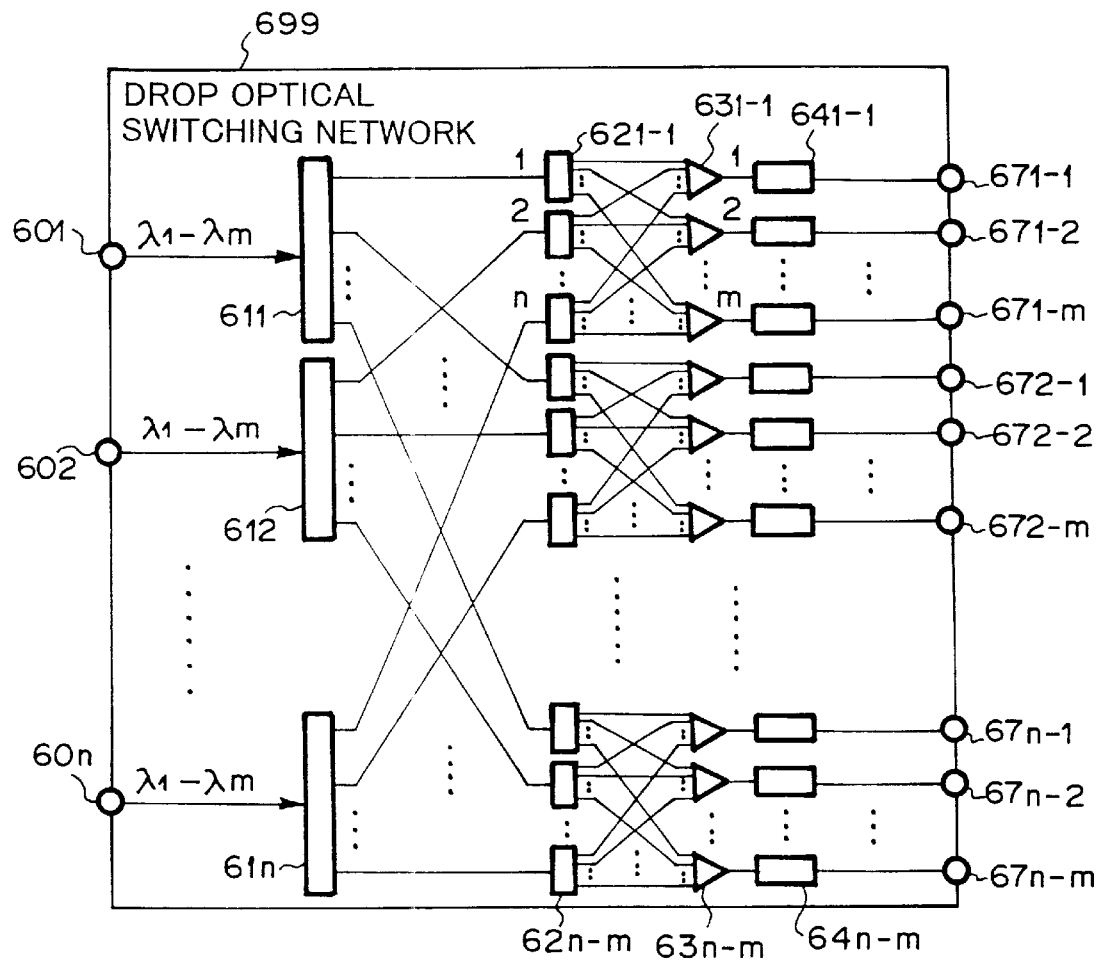

OPTICAL COMMUNICATION NETWORK APPARATUS AND OPTICAL SWITCHING NETWORK

BACKGROUND OF THE INVENTION

1. Field of the Invention

The present invention relates to an optical communication network apparatus and an optical switching network which are mainly applied to an optical communication field.

2. Description of the Related Art

In order to support a requirement for increasing the capacity of communications, an optical communication network apparatus has recently adopted means for performing wavelength multiplexing to increase the capacity in one optical transmission path. In order to practically use, such a network efficiently has been considered an optical cross-connect system for performing a switching operation on an optical-signal basis at a communication network node to perform drop and insert of an optical signal, which is disclosed by T. Shiragaki et al. in "A Novel Optical Cross-Connect System using Photonic Switch Matrices for Flexible Optical Network Reconfiguration" in Proc. ECOC '93, ThP 5.3, pp.153–156, 1993 (paper 1).

Here, "drop" means that in a network node a signal is output from another communication device of the node concerned, and "insert" means that in a network node a signal from another communication device of the node concerned is convoluted with transmission signal light and then transmitted to another node. In the following description, "pass-through" means that an optical signal transmitted is directly transmitted to another communication device of the node concerned with neither drop nor insert, or transmitted to another node while performing spatially connection switch or vary the wavelength. Further, "wavelength blocking" means that two or more different optical signals are convoluted with each other in the same wavelength in one optical transmission path (optical fiber or the like).

A conventional optical cross-connect node apparatus is disclosed by T. Shiragaki et al. "Optical Cross-connect System using Fixed-Wavelength Converters to Avoid Wavelength Blocking, "First Optoelectronics and Communications Conference (OECC '96) Technical Digest, PD1-5, pp.10–11, 1996) (paper 2), and the construction thereof is shown in FIG. 15.

In the above-described optical cross-connect node apparatus, wavelength multiplexing of m waves is performed on one optical transmission path, and optical transmission paths of n are input/output from another nodes. Therefore, totally m×n optical signals are input/output from other nodes. Input terminals 1501 to 150n are connected to front other nodes, and output terminals 1531 to 153n are connected to rear other nodes. Input interfaces 151-1 to 151-m×n and output interfaces 152-1 to 152-m×n are connected to an electrical digital cross-connect system in the node concerned to receive and transmit signals. Optical signals input from the input terminals 1501 to 150n are subjected to wavelength demultiplexer by wavelength demultiplexer 1541 to 154n and then input to an optical switching network 1599.

The optical signals are switched by the optical switching network 1599 and then input to wavelength converters 1551-1 to 155n–m. The optical signals are subjected to wavelength conversion by the wavelength converters 1551-1 to 155n–m so that no wavelength blocking occurs among the respective output terminals, and then transmitted to the rear other nodes. In order to enable the drop and the insert of all the optical signals in the nodes, the optical switching network 1599 is provided with m×n input terminals for the drop and m×n output terminals for the insert. Optical signals of m×n are input from the rear other nodes and optical signals of m×n are input from the input interfaces, so that totally 2m×n optical signals are input, and thus 2m×n input terminals are provided to the optical switching network 1599. With respect to the output terminals, m×n output terminals for transmission to the rear other nodes are provided, and m×n output terminals for drop to the node concerned (self node), and thus totally 2m×n output terminals are provided to the optical switching network 1599.

In the case of the above-described optical cross-connect node apparatus, the optical signals transmitted can be output to the output terminals which are connected to the output interfaces and the rear other nodes, and the input signals input from the input interfaces can be output to the output terminals. In a network where an optical cross-connect node apparatus is connected to nodes on various routes, it is required that an optical signal coming along any route can be switched to any route and output to any output interface, and an optical signal input from any input interface can be output to any route, and thus such a switching function is needed to the optical switching network work.

However, in order to enable a transmitted optical signal to be output to any output terminal while its wavelength is converted to any wavelength and also to any output interface, and also enable an optical signal input from any input interface to be output to any output terminal while its wavelength is converted to any wavelength, the optical switching network must be provided with non-blocking switching functions of $(2m \times n) \times (2m \times n)$. For example, in the case where a matrix switch structure (cross-bar structure) is adopted, a large number of optical switch elements $((2mn) \times (2mn) = 4(m \times n)^2$ must be provided. Accordingly, an optical communication network apparatus containing an optical switching network thus constructed must be designed in large amount volume and large scale and in high cost.

SUMMARY OF THE INVENTION

The present invention has been implemented in view of the foregoing, and has an object to provide an optical communication network apparatus and an optical switching network which can be designed in small mount volume and relatively small scale and in low cost.

In order to attain the above object, according to a first aspect of the present invention, an optical communication network apparatus comprises plural optical branching means each having an input terminal, a first output terminal and a second output terminal, a first optical switching network, a second optical switching network, a third optical switching network, plural optical connecting means each having a first input terminal, a second input terminal and an output terminal, a first group of plural input terminals, a first group of plural output terminals, a second group of plural input terminals, and a second group of plural output terminals, wherein the first group of input terminals are connected to the input terminals of the optical branching means, the first output terminals of the optical branching means are connected to the first optical switching network, the first optical switching network is connected to the first input terminals of the optical connecting means, the output terminals of the optical connecting means are connected to the first group of output terminals, the second output terminals of the optical branching means are connected to the second optical switching network, the second optical switching network is connected to the second group of output terminals, the second group of input terminals are connected to the third optical switching network, and the third optical switching network is connected to the second input terminals of the optical connecting means.

Further, according to a second aspect of the present invention, an optical communication network apparatus includes plural optical demultiplexing means, plural optical branching means each having an input terminal, a first output terminal and a second output terminal, a first optical switching network, a second optical switching network, a third optical switching network, plural optical connecting means each having a first input terminal, a second input terminal and an output terminal, plural optical multiplexing means, a first group of plural input terminals, a first group of plural output terminals, a second group of plural input terminals, and a second group of plural output terminals, wherein the input terminals of the first group are connected to the optical demultiplexing means, the optical demultiplexing means are connected to the input terminals of the optical branching means, the first outputs of the optical branching mean are connected to the first optical switching network, the first optical switching network is connected to the first input terminals of the optical connecting means, the output terminals of the optical connecting means are connected to the optical multiplexing means, the optical multiplexing means are connected to the output terminals of the first group, the second output terminals of the optical branching means are connected to the second optical switching network, the second optical switching network is connected to the output terminals of the second group, the input terminals of the second group are connected to the third optical switching network, and the third optical switching network is connected to the second input terminals of the optical connecting means.

According to a third aspect of the present invention, an optical communication network apparatus includes plural optical multiplexing means, plural optical branching means each having an input terminal, a first output terminal and a second output terminal, a first optical switching network, a second optical switching network, a third optical switching network, plural optical connecting means each having a first input terminal, a second input terminal and an output terminal, a first group of plural input terminals, a first group of plural output terminals, a second group of plural input terminals, and a second group of plural output terminals, wherein the input terminals of the first group are connected to the optical demultiplexing means, the optical demultiplexing means are connected to the input terminals of the optical branching means, the first output terminals of the optical branching means are connected to the first optical switching network, the first optical switching network is connected to the first input terminals of the optical connecting means, the output terminals of the optical connecting means are connected to the output terminals of the first group, the second output terminals of the optical branching means are connected to the second optical switching network, the second optical switching network is connected to the output terminals of the second group, the input terminals of the second group are connected to the third optical switching network, and the third optical switching network is connected to the second input terminals of the optical connecting means.

Further, according to a fourth aspect of the present invention, an optical communication network apparatus includes plural optical branching means each having an input terminal, a first output terminal and a second output terminal, a first optical switching network, a second optical switching network, a third optical switching network, plural optical connecting means each having a first input terminal, a second input terminal and an output terminal, plural optical multiplexing means, a first group of plural input terminals, a first group of plural output terminals, a second group of plural input terminals and a second group of plural output terminals, wherein the input terminals of the first group are connected to the input terminals of the optical branching means, the first output terminals of the optical branching means are connected to the first optical switching network, the first optical switching network is connected to the first input terminals of the optical connecting means, the output terminals of the optical connecting means are connected to the optical multiplexing means, the optical multiplexing means are connected to the output terminals of the first group, the second output terminals of the optical branching means are connected to the second optical switching network, and the second optical switching network is connected to the output terminals of the second group, the input terminals of the second group are connected to the third optical switching network, and the third optical switching network is connected to the second input terminals of the optical connecting means.

In each of the above-described optical communication network apparatuses, it is preferable that the first optical switching network has a function of switching allowance or inhibition of passage of an optical signal input to the input terminal and has no spatial connection switching function. Further, it is preferable that the first optical switching network and the third optical switching network can cut off the optical signal input to the input terminal.

Further, according to a fifth aspect of the present invention, an optical switching network includes first optical branching means having plural input terminals and plural output terminals, plural second optical branching means, plural optical switch means, plural optical selection means for selecting only one wave (optical signal) from input multiplexed waves (optical signals), plural wavelength conversion means for converting the wavelengths of input optical signals, plural input terminals and plural output terminals, wherein the input terminals are connected to the first optical branching means, the first optical branching means is connected to the second optical branching means, the second optical branching means are connected to the optical switch means, the optical switch means are connected to the optical selection means, the optical selection means are connected to the wavelength conversion means and the wavelength conversion means are connected to the output terminals.

According to a sixth aspect of the present invention, an optical switching network includes first optical branching means having plural input terminals and plural output terminals, plural second optical branching means, plural optical switch means, plural optical selection means for selecting only one wave (optical signal) from input multiplexed waves (optical signals), plural wavelength conversion means for converting the wavelength of the input optical signals, plural optical multiplexing means, plural input terminals and plural output terminals, wherein the input terminals are connected to the first optical branching means, the first optical branching means is connected to the second optical branching means, the second optical branching means are connected to the optical switch means, the optical switch means are connected to the optical selection means, the optical selection means are connected to the wavelength conversion means, the wavelength conversion means are connected to the wavelength multiplexing means and the wavelength multiplexing means are connected to the output terminals.

In the conventional optical communication network, optical signals from front other nodes and insert signals from front other apparatuses of the node concerned (self node) are input to the same optical switching network, and output signals to rear other nodes and output signals to rear other apparatuses of the node concerned are output from the same optical switching network. Therefore, it also supports such an unnecessary switching state that the optical signals are inserted from the front other apparatuses of the self node and dropped to the rear other apparatuses of the self node, and this is an excess operation. However, in the optical communication network apparatus of the present invention, a switching network for pass-through (signal), an optical switching network for drop and an optical switching network for insert are separated from one another, so that it supports only a necessary state. Therefore, extra optical switch elements can be reduced.

BRIEF DESCRIPTION OF THE DRAWINGS

FIG. 4 is a diagram showing the detailed structure of an optical switching network which is provided to the optical communication network node apparatus shown in FIG. 1;

FIG. 6 is a diagram showing the detailed structure of another embodiment of the optical switching network for drop which is provided to the optical communication network node apparatus shown in FIG. 1;

DETAILED DESCRIPTION OF THE PREFERRED EMBODIMENTS

Preferred embodiments according to the present invention will be described hereunder with reference to the accompanying drawings.

The optical communication network apparatus and the optical switching network will be described in detail with reference to the accompanying drawings.

The optical communication network apparatus of the present invention is directed to an apparatus which targets the drop and insert operation of optical signals from other nodes and the connection switching or ON/OFF operation of passed signals, and it does not target the drop of signals inserted from the self node in the self node. Further, the following description will be made on such a system that the wavelengths of m waves are multiplexed in one optical fiber, optical fibers of n are input to the optical communication network apparatus from front other nodes, and optical fibers of n are output from the optical communication network apparatus to rear other nodes. Further, it is assumed that all the optical signals of m×n can be dropped and inserted in the self node. That is, this means that the present invention targets such a node structure that both of an optical signal being currently used and a backup optical signal are input to input terminals and the both are output to output terminals, and any of the optical signal being currently used and the backup optical signal can be dropped, inserted or switched.

First Embodiment

Figure 1:
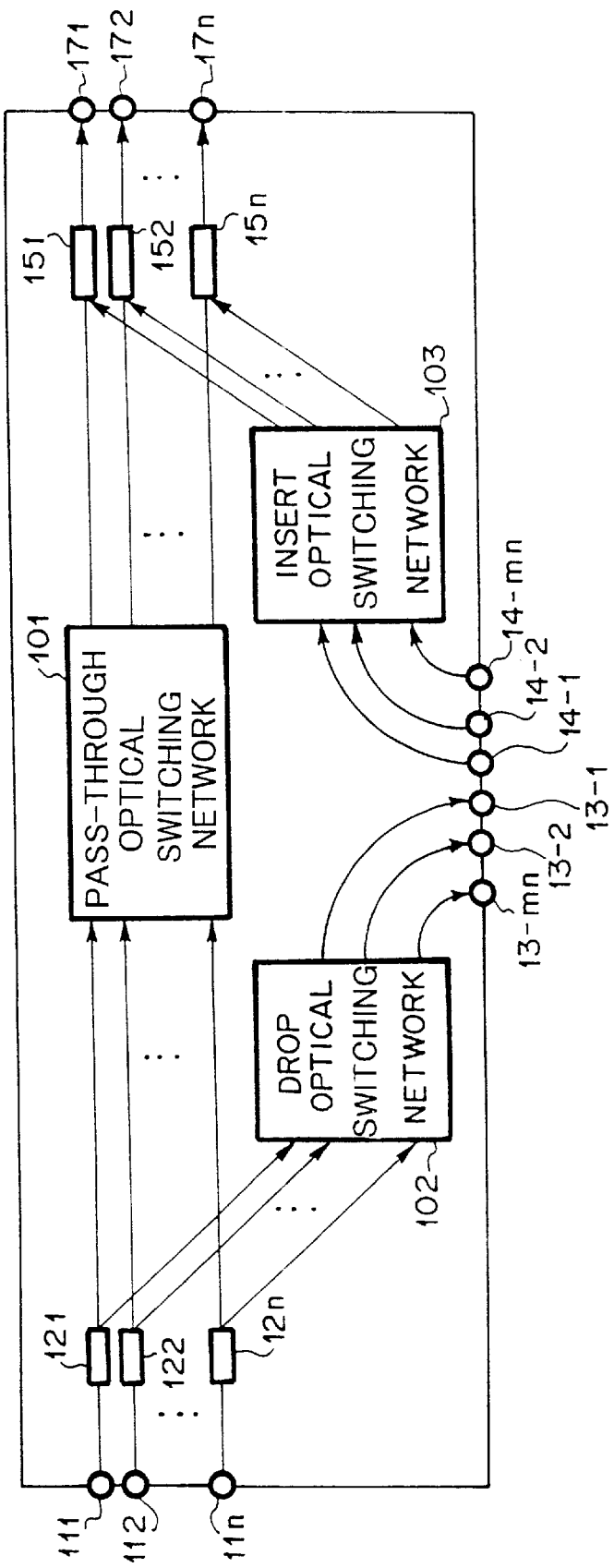
FIG. 1 is a block diagram showing the basic structure of an optical communication network node apparatus according to a first embodiment of the present invention.

FIG. 1 is a block diagram showing the basic structure of an optical communication network node apparatus according to a first embodiment according to the present invention. The optical communication network node apparatus includes input terminals 111 to 11n, 1:2 optical branch units (in the following description, an optical branch unit having one input and two outputs is referred to as "1:2 optical branch unit") 121 to 12n, an optical switching network 101 for pass through (pass-through signals) (hereinafter referred to as "pass-through optical switching network"), 2:1 optical connectors (in the following description, an optical connector having two inputs and one output is referred to as "2:1 optical connector") 151 to 15n, output terminals 171 to 17n, an optical switching network 102 for drop (hereinafter referred to as "drop optical switching network"), output interfaces 13-1 to 13-m×n, input interfaces 14-1 to 14-m×n, and an optical switching network 103 for insert (hereinafter referred to as "insert optical switching network 103).

Of these elements, the input terminals 111 to 11n are connected to the optical fibers from the front other nodes, and the output terminals 171 to 17n are connected to the optical fibers to the rear other nodes. The output interfaces 13-1 to 13-m×n are used to transmit multiplexed/separated optical signals to other apparatuses, and they can be connected to an electrical digital cross-connect apparatus (for example, as described by Joseph Sosnosky, "Service Applications for SONET DCS Distributed Restoration", IEEE J. Selected Areas Communi., vol. 12, no. 1, pp. 59–68, January 1994 (Paper 3) or the like). The input interfaces 14-1 to 14-$m \times n$ receives optical signals from other apparatuses, and they can be connected to the electrical digital cross-connect apparatus as in the case of the output interfaces 13-1 to 13-$m \times n$.

Each of the 1:2 optical branch units 121 to 12$n$ branches an input optical signal into two optical signals, and each of the 2:1 optical connectors 151 combines two optical signals input thereto and outputs a single optical signal thus combined. A fiber adhesion type 1:2 or 2:1 optical connector may be used for these 1:2 optical branch units 121 to 12$n$ and 2:1 optical connectors 151 to 15$n$. The input terminals 111 to 11$n$ and the output terminals 171 to 17$n$ are connected to all the optical transmission paths which are connected to the front and rear other nodes.

Figure 2:
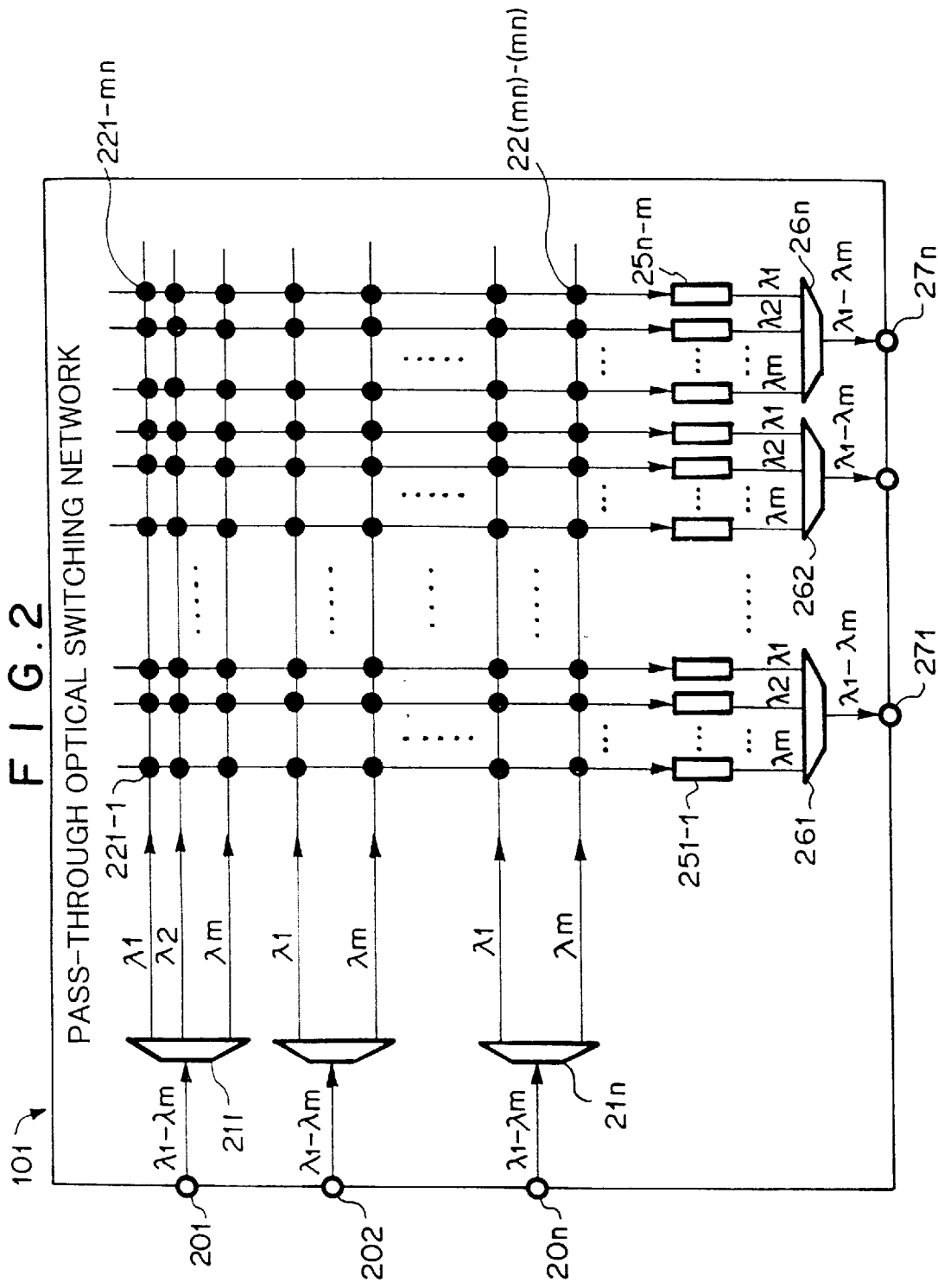
FIG. 2 is a diagram showing the detailed structure of an optical switching network for passage which is provided to the optical communication network node shown in FIG. 1.

FIG. 2 is a diagram showing the detailed structure of the pass-through optical switching network 101. The pass-through optical switching network 101 includes input terminals 201 to 20$n$, wavelength demultiplexing units 211 to 21$n$, 2×2 optical switches 221-1 to 22($m \times n$)-(m×n), wavelength converters 251-1 to 25$n$–$m$, wavelength multiplexers 261 to 26$n$ and output terminals 271 to 27$n$, which are connected to one another in this order.

Of these elements, each of the wavelength converters 251-1 to 25$n$–$m$ is designed so that an electrical signal received in a light receiver is input to an light transmitter for outputting a desired wavelength, thereby modulating the signal. Each of the wavelength converters 251-1 to 25$n$–$m$ has a cut-off function, and this function is achieved by providing a circuit for driving a laser of the light transmitter with a switch for selecting one of a mode in which current is supplied to the laser and a mode in which no current is supplied to the laser. As each of the 2×2 optical switches 221-1 to 221-$m \times n$ may be used an optical switch which varies its refractive index by using the electrooptical effect of $LiNbO_3$ to switch the optical path between a cross state and a bar state (in the figure, the bar state and the cross state are illustrated as a state where an optical path is curved to the right or in the downward direction by 90 degrees and a state where the optical path is linearly directed). A matrix switch may be constructed by arranging in a grid form and connecting these 2×2 optical switches 221-1 to 22($m \times n$)-(m×n) as shown in FIG. 2. AWG (Array Waveguide Grating) may be used as the wavelength multiplexers 261 to 26$n$.

By using the pass-through optical switching network 101, when wavelength-multiplexed light is input to the input terminals 201 to 20$n$, any wavelength at any input terminal 201 to 20$n$ can be converted to any wavelength at any output terminal 271 to 27$n$ by switching the connection state of the 2×2 optical switches 221-1 to 22($m \times n$)-(m×n). Further, by converting the wavelength with the wavelength converters 251-1 to 25$n$–$m$, the optical signals having the same wavelength can be prevented from being input to one of the output terminals 271 to 27$n$. Further, if the wavelength converters 251-1 to 25$n$–$m$ is provided with an ON/OFF function, the signals can be output while cutting off some wavelengths.

Figure 3:
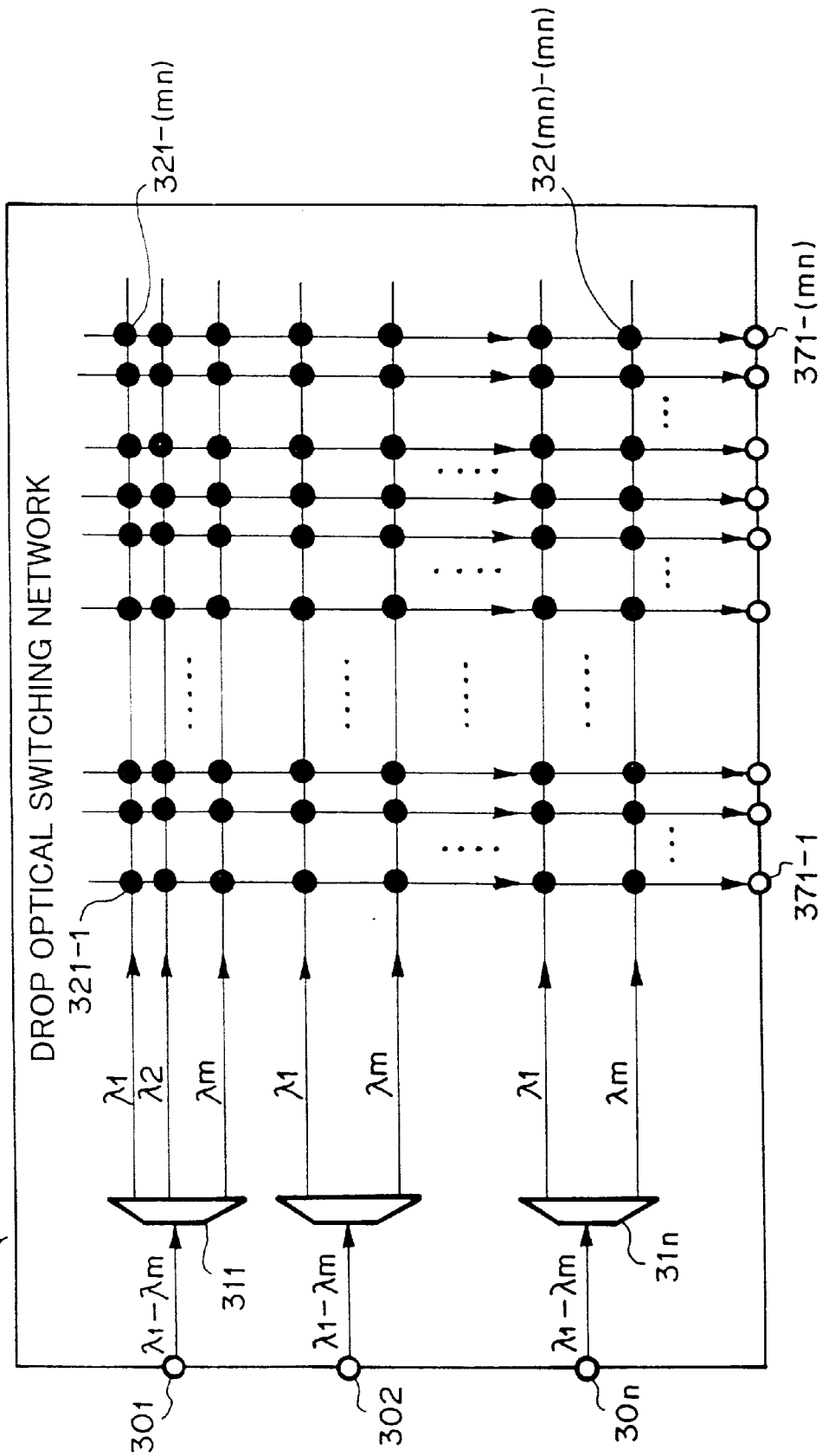
FIG. 3 is a diagram showing the detailed structure of an optical switching network for drop which is provided to the optical communication network node shown in FIG. 1.

FIG. 3 is a diagram showing the detailed structure of an embodiment of the drop optical switching network 102. The drop optical switching network 102 may be constructed by removing the wavelength multiplexers 261 to 26$n$ at the final stage from the pass-through optical switching network 101 as described above. That is, the drop optical switching network 102 includes input terminals 301 to 30$n$, wavelength demultiplexing units 311 to 31$n$, 2×2 optical switches 321-1 to 32($m \times n$)-(m×n), and output terminals 371-1 to 371-($m \times n$), which are connected to one another in this order. The same as shown in FIG. 2 may be used for each part of the above elements. Accordingly, the drop optical switching network can be constructed by using the same as the pass-through optical switching network shown in FIG. 2 and turning off undesired portions thereof.

By using the drop optical switching network 102 thus constructed, when a wavelength-multiplexed optical signal is input, a wavelength-multiplexed-separated optical signal can be output. At this time, as in the case of the pass-through optical switching network 101 shown in FIG. 2, an optical signal having any wavelength of any input terminal 301 to 30$n$ can be converted to any wavelength and output to any output terminal 371-1 to 371-($m \times n$).

FIG. 4 is a diagram showing the detailed structure of the insert optical switching network 103. The insert optical switching network 103 may be constructed by removing the wavelength demultiplexing units 211 to 21$n$ at the initial stage from the above-described pass-through optical switching network 101. That is, the insert optical switching network 103 includes input terminals 401-1 to 401-$m \times n$, 2×2 optical switches 421-1 to 42($m \times n$)-(m×n), wavelength converters 451-1 to 45$n$–$m$, wavelength multiplexers 461 to 46$n$, and output terminals 471 to 47$n$, which are connected to one another in this order. The same as shown in FIG. 2 may be used for each of the above elements.

In the insert optical switching network 103, the wavelength demultiplexing units are removed, and thus signals (waves) are separately input wave by wave because no wavelength multiplexing is performed. The subsequent operation is the same as the above-described pass-through optical switching network 101.

In this case, when an optical signal (one wave) which is not subjected to the wavelength multiplexing is input to the insert optical switching network 103 shown in FIG. 4, a wavelength-multiplexed optical signal can be output. At this time, as in the case of the above-described pass-through optical switching network 101, an optical signal having any wavelength of any input terminal 401-1 to 401-$m \times n$ can be output to any output terminal 471 to 47$n$ while the wavelength thereof is converted to any wavelength.

In the optical communication network node apparatus having the various optical switching networks (the pass-through optical switching network 101, the drop optical switching network 102 and the insert optical switching network 103), an optical signal having any wavelength of any input optical fiber can be dropped, an optical signal having any wavelength in any input optical fiber can be transmitted to any output fiber (any other nodes) while the wavelength thereof is converted to any wavelength, and any inserted signal can be transmitted to any output fiber while the wavelength thereof is converted to any wavelength.

That is, as shown in FIG. 1, in the optical communication network node apparatus, the wavelength-multiplexed optical signals input to the input terminals 111 to 11$n$ are branching by the optical branch units 121 to 12$n$, and input to both the pass-through optical switching network 101 and the drop optical switching network 102. As described above, the wavelength multiplexed optical signal input to the drop optical switching network 102 can be output to any of the output terminals 371-1 to 371-($m \times n$) of the drop optical switching network 102. The output terminals 371-1 to 371-($m \times n$) are connected to the output interfaces 13-1 to 13-$m \times n$, and an optical signal having any wavelength of the wavelength-multiplexed optical signals input to the input terminals 111 to 11n of the apparatus can be output to any of the output interfaces 13-1 to 13-m×n of the apparatus.

On the other hand, with respect to the wavelength-multiplexed signal input to the pass-through optical switching network 101, an optical signal having any wavelength in any input fiber can be output to any output fiber while the wavelength thereof is converted to any wavelength as shown in FIG. 2. Further, optical signals input from the input interfaces 14-1 to 14-m×n are input to the insert optical switching network 103. With respect to the insert optical switching network 103, an optical signal having any wavelength of any input terminal 401-1 to 401-m×n can be output to any output terminal 471 to 47n while the wavelength thereof is converted to any wavelength as shown in FIG. 4.

As shown in FIG. 1, in the 2:1 optical connectors 151 to 15n, the output light of the insert optical switching network 103 and the output light of the pass-through optical switching network 101 are combined with each other. An optical signal input to any optical switching network can be output from any output terminal as an optical signal having any wavelength. In addition, the mode in which the optical signals having the respective wavelengths are output, and the mode in which these signals are not output, can be switched therebetween. If the signals are combined, the combination can be performed with avoiding the wavelength blocking (which means that optical signals having the same wavelength are input to the same output terminals). Specifically, when signals (waves) are combined, the output of one optical switching network may be turned off so as to prevent the optical signals having the same wavelength from being combined with each other, or the wavelength conversion may be performed so that optical signals having different wavelengths are combined with each other, whereby the wavelength blocking can be avoided.

Accordingly, in the optical communication network node apparatus, the optical signal being currently used and the backup optical signal can be input and output. Therefore, when some failure occurs in an optical transmission path or in a node, the failure can be overcome by switching the signal therebetween. For example, the optical signal being currently used and the backup signal are input from the input interfaces 14-1 to 14-m×n to the insert optical switching network 103 and transmitted to another node. At a node at some midpoint to the target node, a route for the optical signal being currently used and the backup signal is constructed by switching the pass-through optical switching network 101. Finally, the drop optical switching network 102 is switched at a node for dropping the optical signal being currently used, whereby the drop of the optical signal being currently used can be performed.

Further, in the case of this optical communication network node apparatus, the number of optical switch elements can be reduced to be less than that of the conventional apparatus, and a node architecture which is performed in low cost and can be implemented in a relatively small scale can be achieved.

In the conventional apparatus, in the case where the lights from the optical fibers of n which are subjected to the m-wave multiplexing as described above are connected to the input terminals and the output terminals, if the wavelength-multiplexed optical signal is considered as being spatially developed, input terminals of m×n for passed signals and input terminals of m×n for insertion, that is, totally 2m×n input terminals are needed while output terminals of m×n for passed signals and output terminals of m×n for drop signals, that is, totally 2m×n output terminals are needed.

Therefore, in the conventional apparatus, if the switching operation between input/output terminals is performed in a non-close mode, a large number of 2×2 optical switch elements (number of cross points) which is equal to $(2m×n)^2 = 4(m×n)^2$ are needed if there is considered a matrix switch in which wave multiplexing is spatially developed. However, in the apparatus of the present invention, lights from the optical fibers of n which are subjected to the m-wave multiplexing are input to the pass-through optical switching network 101, and the lights of n which are subjected to the m-wave multiplexing are output therefrom. When the matrix switch in which the wave multiplexing is spatially developed as shown in FIG. 2 is considered, optical switch elements of $(m×n)^2$ are needed in the pass-through optical switching network 101. Further, since optical signals from optical fibers of n which are subjected to the m-wave multiplexing are input to the drop optical switching network and optical signals of m×n are output therefrom, 2×2 optical switch elements of $(m×n)^2$ are needed in the drop optical switching network 102 if the matrix switch in which the wave multiplexing is spatially developed is considered.

Still further, optical signals of m×n are input to the insert optical switching network 103 and optical signals of n which are subjected to the m-wave multiplexing are output. Therefore, if any optical signal is output to any output terminal, optical switch elements of $(m×n)^2$ are needed to the insert optical switching network 103 when the matrix switch in which the wavelength multiplexing is spatially developed as shown in FIG. 4.

Accordingly, in the apparatus of this embodiment, totally $3(m×n)^2$ optical switch elements are needed. This number is smaller than the number $(4(m×n)^2)$ needed in the conventional apparatus by $(m×n)^2$, and thus the apparatus of this embodiment can be implemented in a simple structure and in low cost. This is because the conventional apparatus also supports the connections from the input interfaces 1511 to 151n to the output interfaces 1521 to 152n which are originally unnecessary, whereas the apparatus of the present invention does not support the unnecessary connection state (the connection between the insert input interface and the drop output interface) and thus there is no extra switch.

Figure 15:
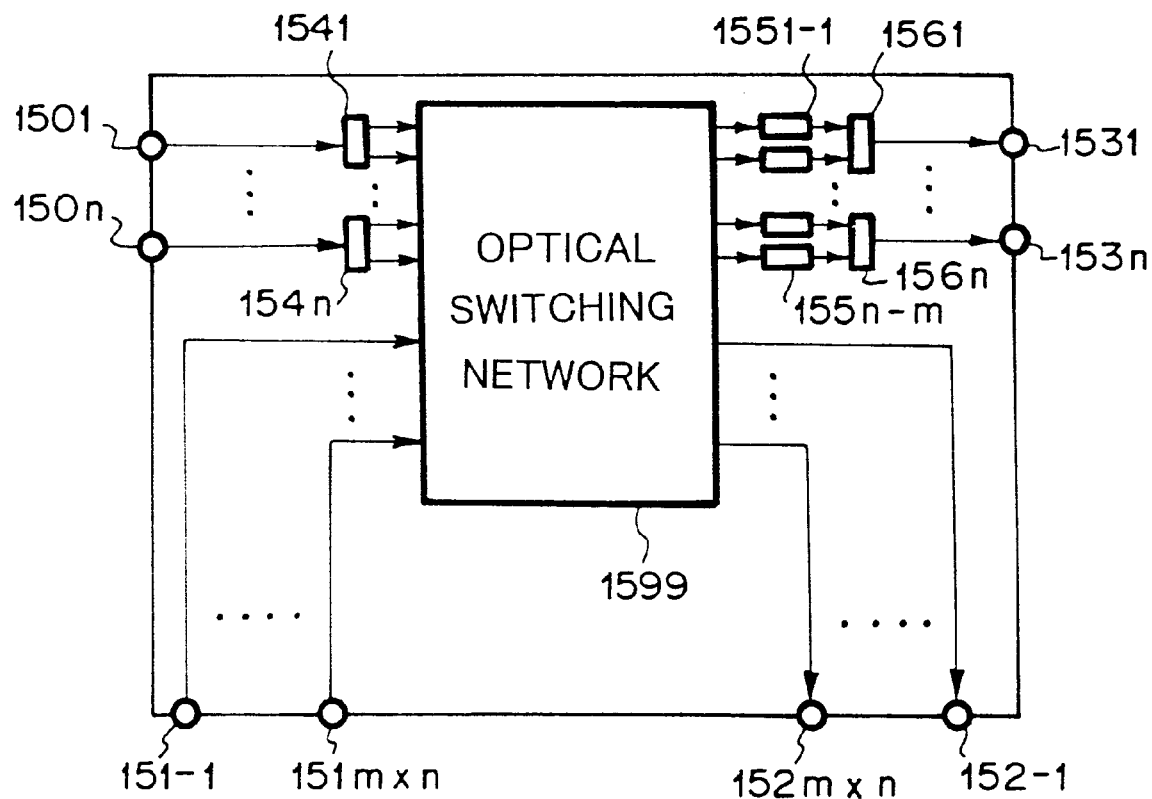
FIG. 15 is a block diagram showing the basic structure of a conventional optical communication network node apparatus (optical cross-connect node apparatus).

The apparatus of this embodiment needs the optical switch elements of $3(m×n)^2$, totally. This number is smaller than that $(4(m×n))$ needed by the conventional apparatus by $(m×n)^2$, and thus the cost can be reduced with a simple structure. This is because the conventional apparatus shown in FIG. 15 supports the connections from the interfaces 1511 to 151n to the output interfaces 1521 to 152n which are originally unnecessary, whereas the apparatus of this embodiment does not support the unnecessary connection state (the connection between the insert input interface and the drop output interface) and thus there is no extra switch. In the apparatus of this embodiment, if an optical signal monitoring apparatus is connected to a part of the output interfaces of the drop optical switching network 102, optical signals which pass-through the node could be monitored at all times. This operation can be performed because an optical signal is branched by an optical branch unit and the same signal are input to both the pass-through optical switching network 101 and the drop optical switching network 102.

Figure 5:
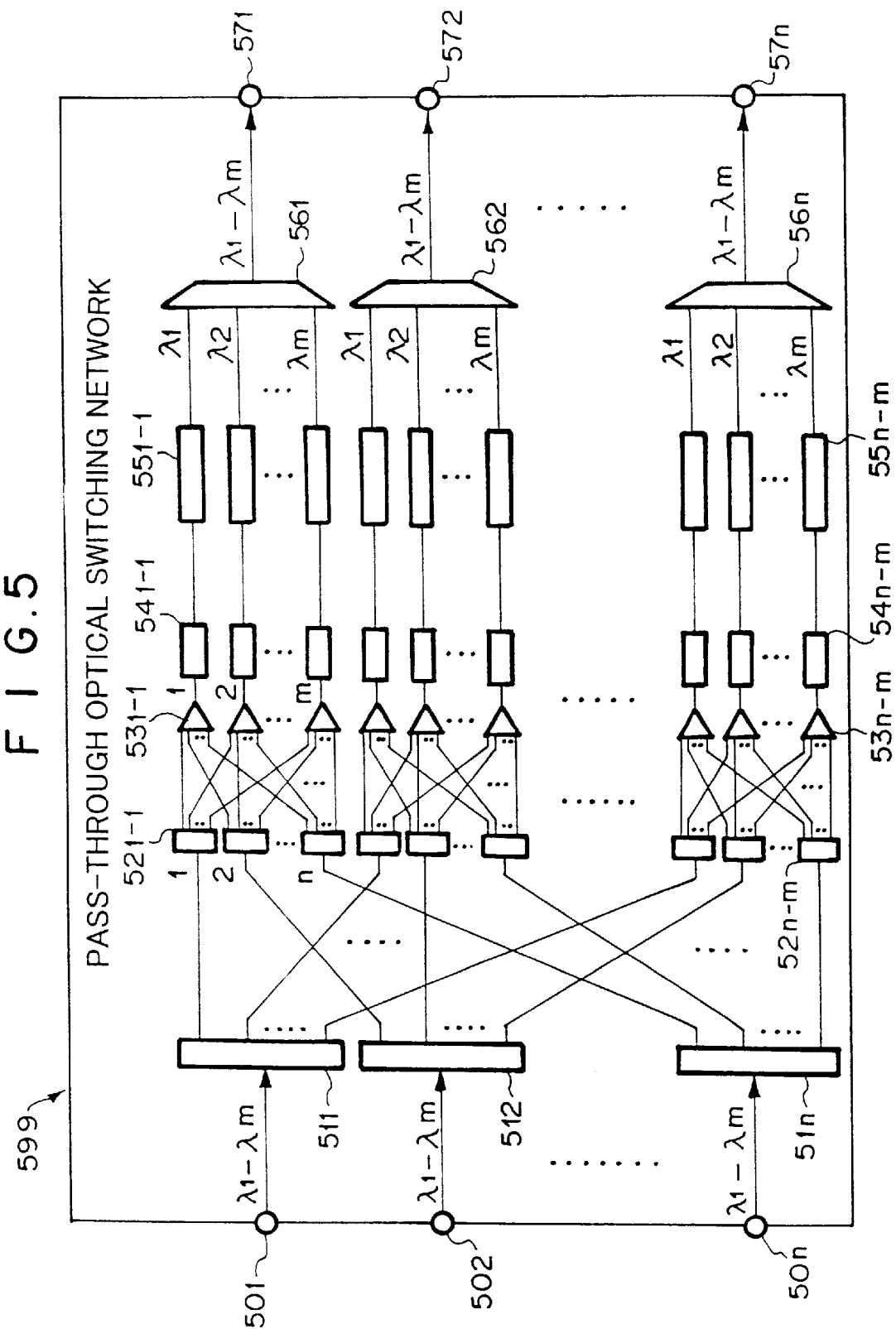
FIG. 5 is a diagram showing the detailed structure of another embodiment of the optical switching network for passage which is provided to the optical communication network node apparatus shown in FIG. 1.

FIG. 5 is a diagram showing the detailed structure of a pass-through optical switching network 599 which is another embodiment of the pass-through optical switching network 101. The pass-through optical switching network 599 is a parallel λ-switch disclosed in a paper (M. Nishio and S. Suzuki, "Photonic Wavelength-Division Switching Network Using a Parallel λ-switch", Springer Series in Electronics and Photonics, vol. 29, Photonic Switching II (Editor: K. Tada, H. S. Hinton), pp. 287, FIG. 2, 1990).

That is, the pass-through optical switching network 599 includes input terminals 501 to 50n, 1:n optical branch units for branching the power of input light to n parts, 1:m optical branch units 521-1 to 52n–n for branching the power of input light to m parts, n×1 optical selectors 531-1 to 53n–m for selecting one of input lights of n, wavelength selection filters 541-1 to 54n–m, wavelength converters 551-1 to 55n–m, wavelength multiplexers 561 to 56n, and output terminals 571 to 57n, which are connected to one another in this order. However, the outputs of the 1:n optical branch units 511 to 51n and the 1:m optical branch units 521-1 to 52n–n are connected to different rear stages as shown in the FIG. 5.

For example, one of the outputs of the optical branch units 511 is connected to the 1:m optical branch unit 521-1 which is finally connected to the output terminal 571, and the other is connected to the 1:m optical branch unit 522-1 which is finally connected to the output terminal 572. Each of the n×1 optical selectors (spatial divisional optical switch) 531-1 to 53n–m selects one of input lights of n, and each of the 1:m optical branch units 521-1 to 52n–n is connected to those of the n×1 optical selectors 531-1 to 53n–m, as shown in FIG. 5.

Each of the wavelength selection filters 541-1 to 54n–m is a wavelength-variable BPF (Band Pass Filter) for light which can select and output only one wave when an optical signal obtained by wavelength-multiplexing m waves is input, and it may be constructed by using an interference film filter or FP (Fabry-Perot) filter. Each of the wavelength converters 551-1 to 55n–m may be implemented by inputting an electrical signal received in a light receiver to a light transmitter for outputting a desired wavelength, thereby modulating the input optical signal. Each of the wavelength converters 551-1 to 55n–m has a cut-off function, and this is constructed by providing a circuit for driving a laser of the light transmitter with a switch for performing a switching operation between a mode in which current is supplied to the laser and a mode in which no current is supplied to the laser. AWG (Array Waveguide Grating) may be used for the wavelength multiplexers 561 to 56n.

By using the pass-through optical switching network 599, when the wavelength-multiplexed light is input to the input terminals 501 to 50n, the n×1 optical selectors 531-1 to 53n–m and the wavelength selection filters 541-1 to 54n–m are switched, whereby an optical signal having any wavelength of any input terminal 501 to 50n can be output to any output terminal 571 to 57n while the wavelength thereof is converted to any wavelength under a predetermined control. Accordingly, a multicast type structure (broadcast type connection may be also possible) can be achieved. This is because the wavelength-multiplexed optical signals from the input terminals 501 to 50n are input to specific ones of the n×1 optical selectors 531-1 to 53n–m by the 1:n branch units 511 to 51n and the 1:m branch units 521-1 to 52n–n, so that the wavelength-multiplexed signal can be selected from any input terminal 501 to 50n by the n×1 optical selectors 531-1 to 53n–m and also any wavelength can be selected from the optical signal selected by the wavelength selection filters 541-1 to 54n–m. Further, the optical signals having the same wavelength can be prevented from being input to one optical fiber by the wavelength converters 551-1 to 55n–m. In addition, the wavelength converters 551-1 to 55n–m has the ON/OFF function, so that the optical signal can be cut off.

FIG. 6 is a diagram showing the detailed structure of the drop optical switching network 699 which is another embodiment of the drop optical switching network 102. The drop optical switching network 699 may be constructed by removing the wavelength multiplexers 561 to 56n at the final stage from the parallel λ switch of the pass-through optical switching network 599 shown in FIG. 5. That is, the drop optical switching network 699 includes input terminals 601 to 60n, 1:n optical branch units 611 to 61n, 1:m optical branch units 621-1 to 62n–n, n×1 optical selectors 631-1 to 63n–m, wavelength selection filters 641-1 to 64n–m, and output terminals 671-1 to 67n–m, which are connected to one another in this order, and the same as shown in FIG. 5 may be used as each element.

Of these elements, an element which can perform a switching operation between a mode in which light is output and a mode in which no light is output may be used for the wavelength selection filters 641-1 to 64n–m. When the wavelength of each of the wavelength selection filters 641-1 to 64n–m is set to be coincident with the wavelength of an input signal light, the mode in which the light is output is set. On the other hand, when the wavelength of each wavelength selection filter is set to be different from that of the input signal light, the mode in which no light is output is set.

In the drop optical switching network 699 thus constructed, when a wavelength-multiplexed optical signal is input, the wavelength multiplexed separated optical signal can be output. At this time, as in the case of the pass-through optical switching network 599 shown in FIG. 5, an optical signal having any wavelength of any input fiber can be output to any output terminal 671-1 to 67n–m while the wavelength thereof is converted to any wavelength. This is because as in the case of FIG. 5, the wavelength-multiplexed optical signals from all the input terminals 601 to 60n are distributed to the inputs of the n×1 optical selectors 631-1 to 63n–m and thus the optical signal of any input terminal 601 to 60n can be selected by the n×1 optical selectors 631-1 to 63n–m, and also any wavelength can be selected by the wavelength selection filters 641-1 to 64n–m at the rear stage.

Figure 7:
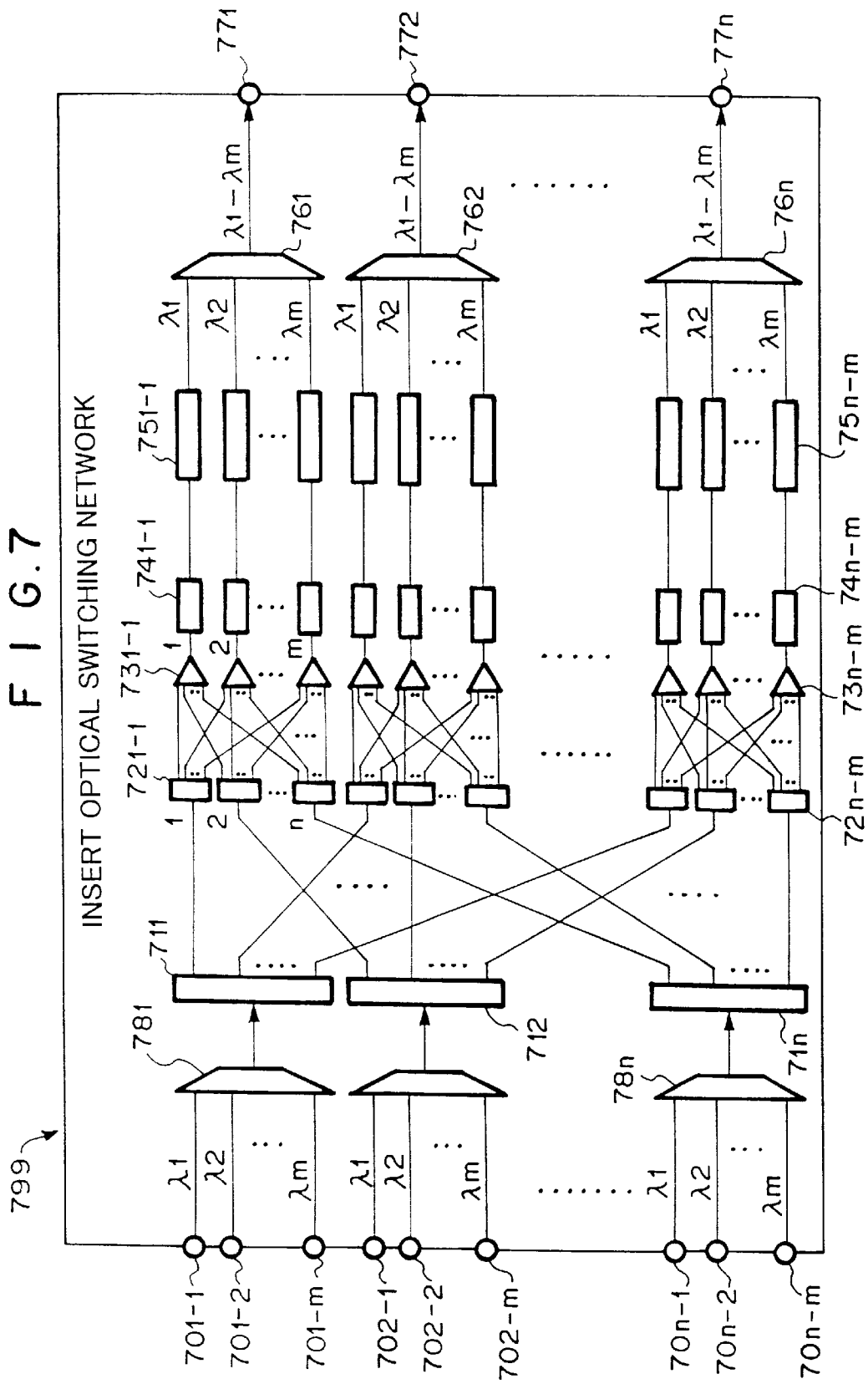
FIG. 7 is a diagram showing the detailed structure of another embodiment of the optical switching network for insert which is provided to the optical communication network node apparatus shown in FIG. 1.

FIG. 7 is a diagram showing the detailed structure of an insert optical switching network 799 which is another embodiment of the insert optical switching network 103. The insert optical switching network 799 includes input terminals 701-1 to 70n–m, wavelength multiplexers 781 to 78n, 1:n optical branch units 711 to 71n, 1:m optical branch units 721-1 to 72n–n, n×1 optical selectors 731-1 to 73n–m, wavelength selection filters 741-1 to 74n–m, wavelength converters 751-1 to 75n–m, wavelength multiplexers 761 to 76n, and output terminals 771 to 77n, which are connected to one another in this order. The same as shown in FIG. 5 may be used as each element.

In the case of the insert optical switching network 799, wavelength multiplexers 781 to 78n are disposed at the front side of the 1:n optical branch units used in the initial stage of the parallel λ switch of FIG. 5, and optical signals which are input without being wavelength-multiplexed and with being separated wave by wave are subjected to the wavelength multiplexing and then input to the 1:n optical branch units 711 to 71n. The subsequent operation is the same as shown in FIG. 5.

In the insert optical switching network 799, when an optical signal (one wave) which is not wavelength-multiplexed is input, a wavelength-multiplexed optical signal can be output. However, at this time, as in the case of the pass-through optical switching network 599 shown in FIG. 5, an optical signal having any input terminal 701-1 to 70n–m can be output to any output terminal 771 to 77n while the wavelength thereof is converted to any one (i.e., the optical signal is wavelength-multiplexed).

In the case of the optical communication network node apparatus having these various optical switching networks (the pass-through optical switching network 599, the drop optical switching network 699, the insert optical switching network 799), an optical signal having any wavelength of any input optical fiber can be dropped, an optical signal having any wavelength of any input fiber can be output to any output fiber (any other node) while the wavelength thereof is converted to any wavelength, and any insert signal can be output to any output fiber while the wavelength thereof is converted to any wavelength.

Further, in the optical communication network node apparatus, the number of necessary optical switch elements can be reduced as compared with the conventional apparatus using only one optical switching network because the optical electric network of the present invention is divided into three parts. In addition, the branching number in one optical switching network may be set to a small value, and also the size of the optical selectors to be prepared may be reduced, so that there can be achieved a node structure which has a small optical loss and can be designed in a low cost and in a relatively small scale.

Second Embodiment

Figure 8:
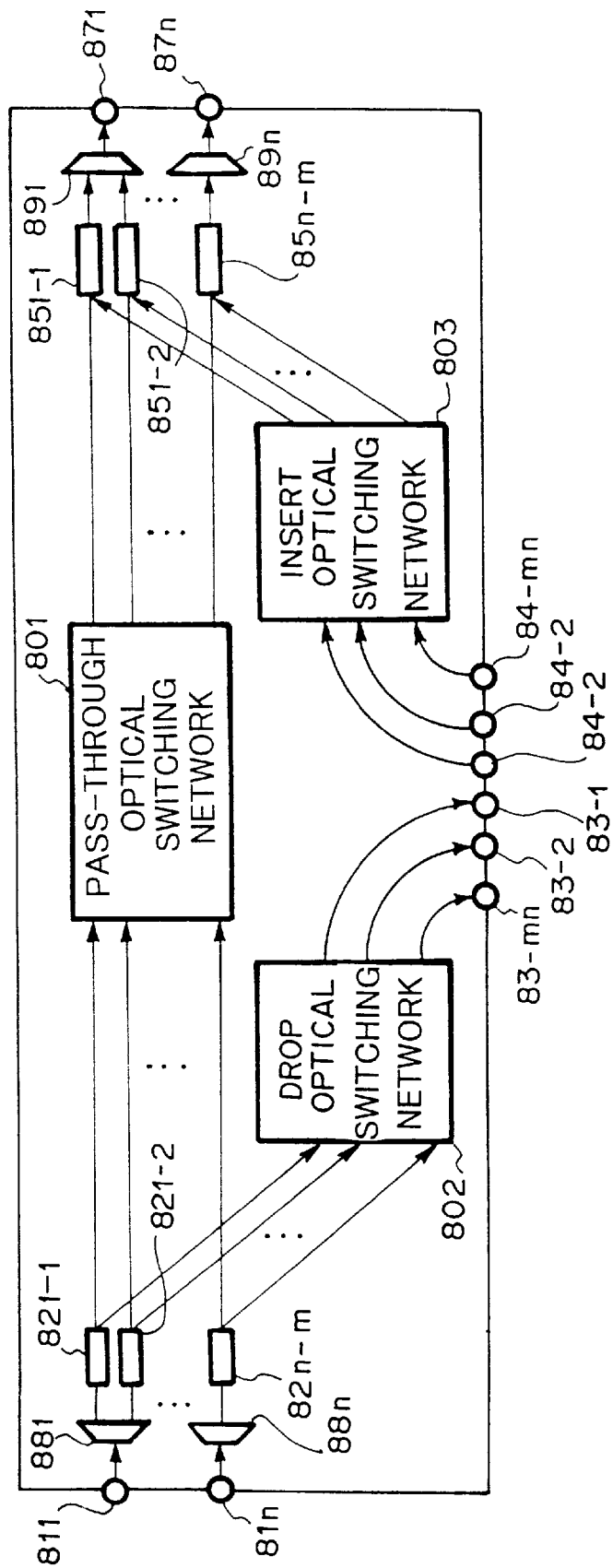
FIG. 8 is a block diagram showing the basic structure of the optical communication network node apparatus according to a second embodiment of the present invention.

FIG. 8 is a block diagram showing the basic structure of an optical communication network node apparatus according to a second embodiment of the present invention. The optical communication network node apparatus includes input terminals 811 to 81$n$, wavelength demultiplexing units 881 to 88$n$, 1:2 optical branch units 821-1 to 82$n$–$m$, pass-through optical switching network 801, 2:1 optical connectors 851-1 to 85$n$–$m$, wavelength multiplexers 891 to 89$n$, output terminals 871 to 87$n$, drop optical witch electronic network 802, output interfaces 83-1 to 83-$m \times n$, input interfaces 84-1 to 84-$m \times n$ and insert optical switching network 803.

Of these elements, the 1:2 optical branch units 821-1 to 82$n$–$m$ and the 2:1 optical connectors 851-1 to 85$n$–$m$ may be designed in the same structure as shown in FIG. 1. Further, the wavelength multiplexers 891 to 89$n$ may be designed in the same structure as the wavelength multiplexers 561 to 56$n$.

Figure 9:
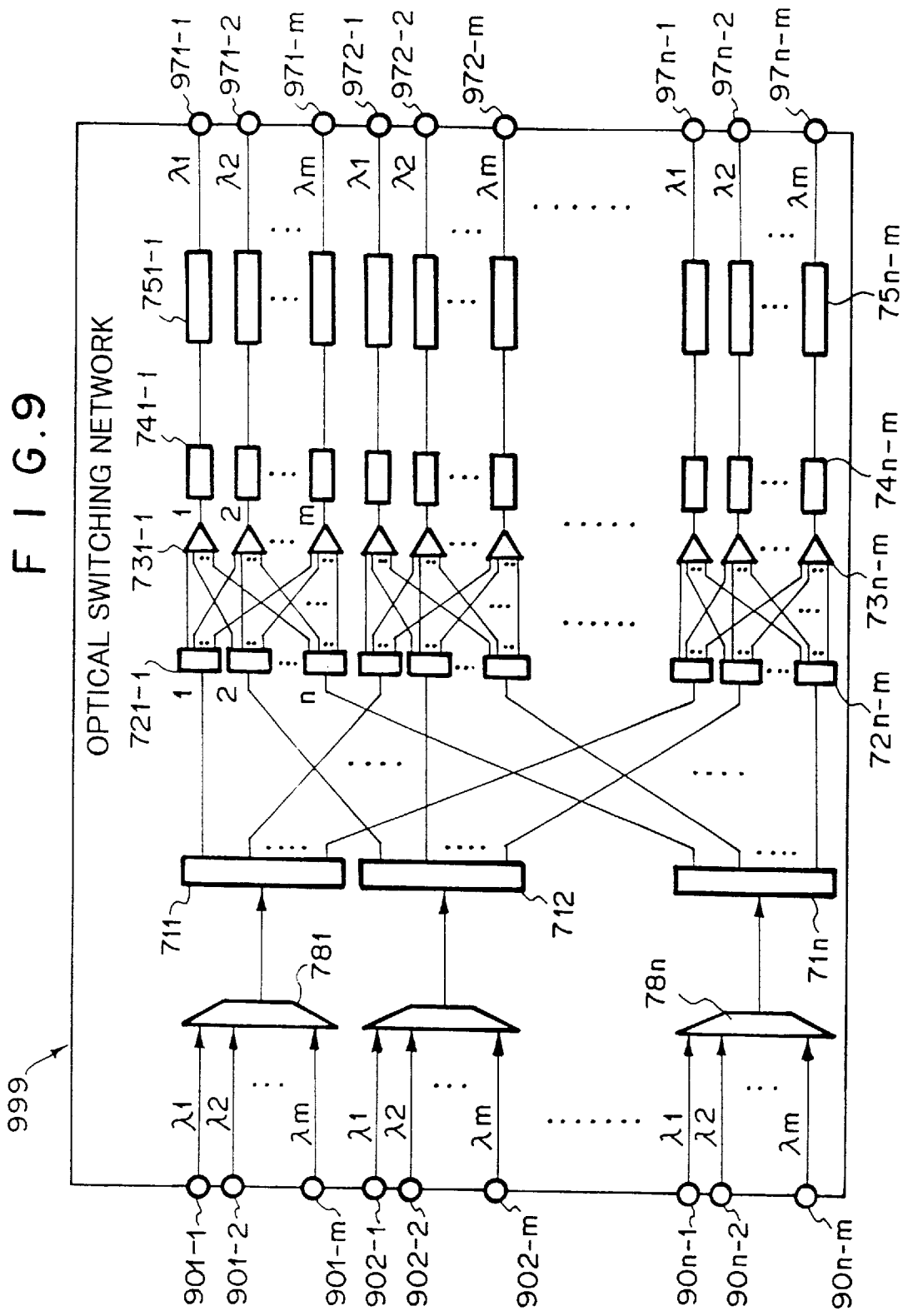
FIG. 9 is a diagram showing the detailed structure of an optical switching network which is applicable to an optical switching network for passage and an optical switching network for insert which are provided to the optical communication network node apparatus shown in FIG. 8.

FIG. 9 is a diagram showing the detailed structure of an optical switching network 999 which is applicable to the pass-through optical switching network 801 and the insert optical switching network 803. The optical switching network 999 includes input terminals 901-1 to 90$n$–$m$, wavelength multiplexers 781 to 78$n$, 1:$n$ optical branch units 711 to 71$n$, 1:$m$ optical branch units 721-1 to 72$n$–$n$, $n \times 1$ optical selectors 731-1 to 73$n$–$m$, wavelength selection filters 741-1 to 74$n$–$m$, wavelength converters 751-1 to 75$n$–$m$ and output terminals 971-1 to 97$n$–$m$.

In the optical switching network 999, the optical signals which are input to the input terminals 901-1 to 90$n$–$m$ and are not wavelength-multiplexed are subjected to the wavelength multiplexing by the wavelength multiplexers 781 to 78$n$, and then input to the 1:$n$ optical branch units 711 to 71$n$. The subsequent operation is the same as the drop optical switching network 699 described with reference to FIG. 6, whereby any optical signal can be output to the output terminals 971-1 to 97$n$–$m$.

The drop optical switching network 802 in the optical communication network node apparatus may be constructed by removing the wavelength converters 751-1 to 75$n$–$m$ from the optical switching network 999 shown in FIG. 9. This optical communication network node apparatus uses the optical switching network 999. However, in place of this optical switching network 999, an optical switching network having a (m×n)×(m×n) matrix structure may be used.

In the optical communication network node apparatus according to the second embodiment, the input wavelength-multiplexed signal light is subjected to the wavelength demultiplex by the wavelength demultiplexing units 881 to 88$n$, then branched by the 1:2 optical branch units 821-1 to 82$n$–$m$ and then input to the drop optical switching network 802. These optical switching networks can switch the wavelength-multiplexed separated optical signals in the non-close mode. Therefore, they can output any optical signal to any output interface 83-1 to 83-$mn$, and can transmit any optical to the pass-through optical switching network 801 while the wavelength thereof is converted to any wavelength of any optical fiber. Further, optical signals input from the input interfaces 84-1 to 84-$mn$ are input to the insert optical switching network 803, and any input signal can be output to any output terminal 871 to 87$n$ with being subjected to the wavelength demultiplex.

On the other hand, an optical signal which passes through the pass-through optical switching network 801 can be output to any output terminal 871 to 87$n$. With respect to the insert optical switching network 803 and the pass-through optical switching network 801, the wavelength converters has the gate switch function, and thus the output optical signals from the insert optical switching network 803 and the pass-through optical switching network 801 can be avoided from being input to the 2:1 optical connectors 851-1 to 85$n$–$m$ at the same time, so that the signals can be combined without inducing the wavelength blocking.

The optical communication network node apparatus of the second embodiment is designed by inverting the positional relationship between the wavelength demultiplexing units and the optical branch units and the wavelength multiplexers and the optical connectors of the embodiment 1 (the wavelength demultiplexing units and the wavelength multiplexers are contained in the optical switching network), and the number of optical switch elements which are substantially required is the same as the first embodiment. Accordingly, the number of necessary optical switch elements can be also reduced in the optical communication network node apparatus.

Third Embodiment

Figure 10:
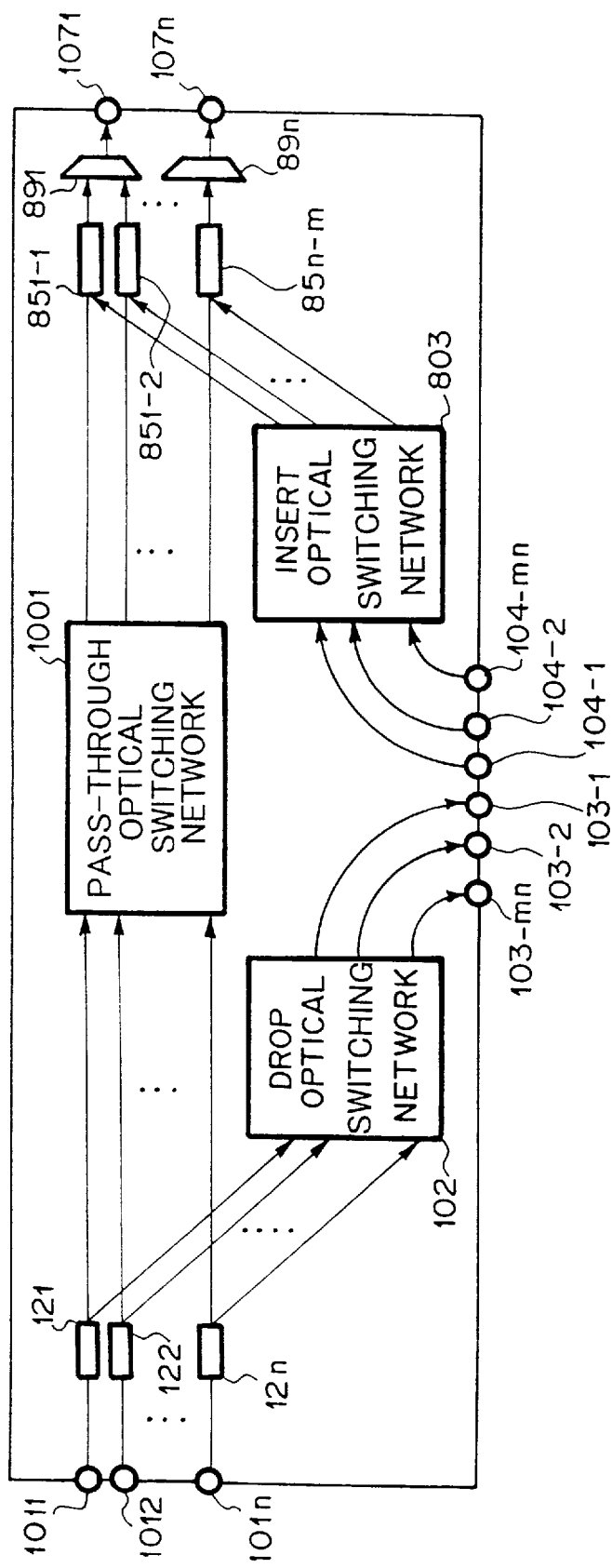
FIG. 10 is a block diagram showing the basic structure of the optical communication network node apparatus of a third embodiment of the present invention.

FIG. 10 is a block diagram showing the basic structure of the optical communication network node apparatus according to a third embodiment of the present invention. The optical communication network node apparatus includes input terminals 1011 to 101$n$, 1:2 optical branch units 121 to 12$n$, a pass-through optical switching network 1001, 2:1 optical connectors 851-1 to 85$n$–$m$, wavelength multiplexers 891 to 89$n$, output terminals 1071 to 107$n$, a drop optical switching network 102, output interfaces 103-1 to 103-$mn$, input interfaces 104-1 to 104-$mn$ and an insert optical switching network 803. In this case, an optical signal output from the drop optical switching network 102 is output to an external device which is connected to the output interfaces 103-1 to 103-$mn$.

The input interfaces 104-1 to 104-$mn$ inputs to the insert optical switching network 803 those signals which are input from another external device connected thereto. The pass-through optical switching network 1001 may be constructed by connecting the wavelength converters 251-1 to 25$n$–$m$ used in the pass-through optical switching network shown in FIG. 2 to the respective output terminals 671-1 to 67$n$–$m$ of the drop optical switching network 699 shown in FIG. 6. The drop optical switching network 1002 may be used designed in the same structure as show in FIG. 6. The insert optical switching network 803 may be designed in the same structure as shown in FIG. 8.

In the optical communication network node apparatus thus constructed, an optical signal having any wavelength input to any optical fiber can be output to any output interface 103-1 to 103-*mn*, and an optical signal having any wavelength input to any input interface 104-1 to 1-4-*mn* can be output to any output terminal 1071 to 107*n* while converted to an optical signal having any wavelength. Further, an optical signal having any wavelength input to any input terminal 1011 to 101*n* can be output to any output terminal 1071 to 107*n* while converted to an optical signal having any wavelength. At this time, each of the pass-through optical switching network 1001 and the insert optical switching network 803 has the function of cutting off the output signal. Therefore, when the signals are coupled by the 2:1 optical connectors 851-1 to 85*n*–*m*, the coupling can be performed in the state that the optical signals from both the electric networks are not input, that is, the wavelength blocking can be avoided.

In the case of the optical communication network node apparatus of the third embodiment, the coupling of the wavelength-multiplexed optical signals is not performed in the stage where the 2:1 optical connectors are used in the apparatus of the first embodiment. Rather, the coupling of the waves (signals) is performed one after another, and finally the wavelength multiplexing is performed. However, since this embodiment is merely different from the first embodiment in that the arrangement order of the wavelength multiplexers and the 2:1 optical connectors is different (in the first embodiment, the wavelength multiplexers are contained in the insert optical switching network and the pass-through optical switching network), and thus the number of optical switch elements can be reduced as in the case of the first embodiment.

Fourth Embodiment

Figure 11:
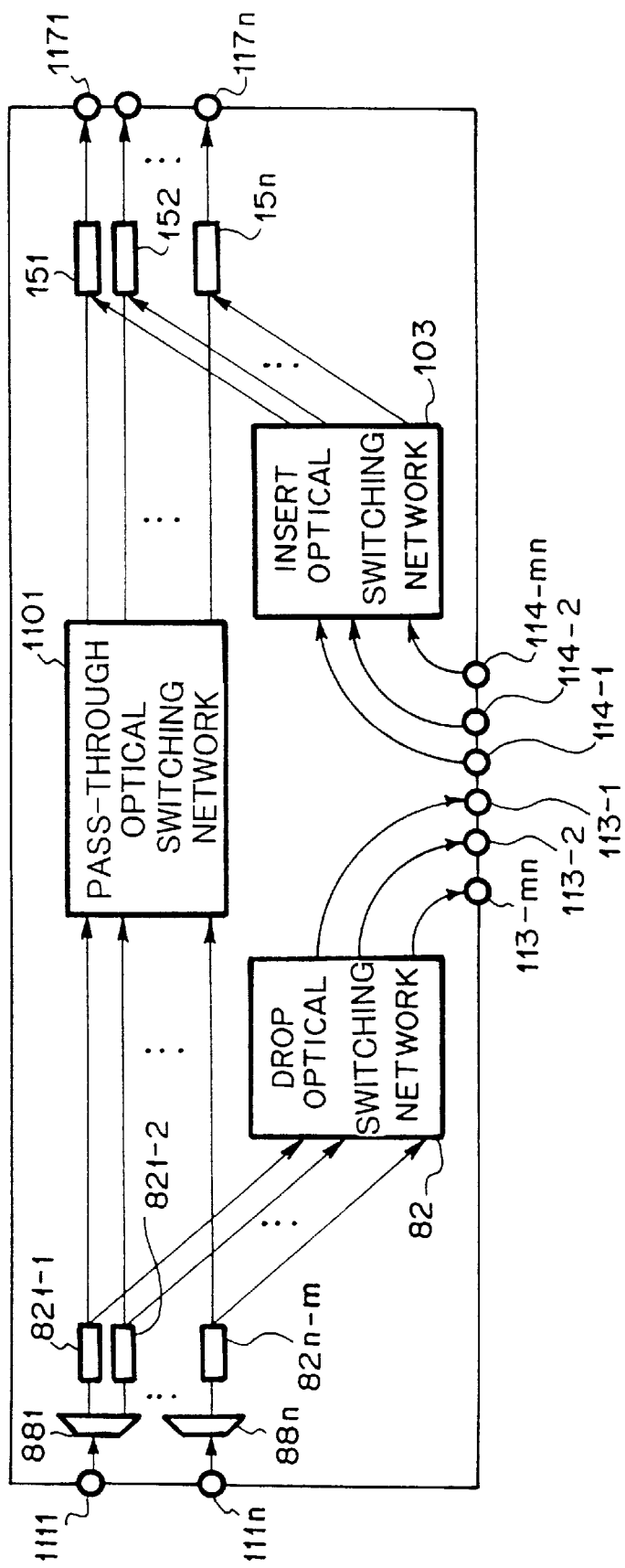
FIG. 11 is a block diagram showing the basic structure of the optical communication network node apparatus according to a fourth embodiment of the present invention.

FIG. 11 is a block diagram showing the basic structure of an optical communication network node apparatus according to a fourth embodiment of the present invention. the optical communication network node apparatus includes input terminals 1111 to 111*n*, wavelength demultiplexing units 881 to 88*n*, 1:2 optical branch units 821-1 to 82*n*–*m*, pass-through optical switching network 1101, 2:1 optical connectors 151 to 15*n*, output terminals 1171 to 117*n*, drop optical switching network 802, output interfaces 113-1 to 113-*mn*, input interfaces 114-1 to 114-*mn*, and an insert optical switching network 103. In this case, the optical signal output from the drop optical switching network 802 is output to an external device connected to the output interfaces 113-1 to 113-*mn*.

Each of the input interfaces 114-1 to 114-*mn* inputs to the insert optical switching network 103 an optical signal input from another external device connected thereto (to which the structure shown in FIG. 7 or the structure shown in FIG. 4 is applicable). The structure shown in FIG. 7 or the structure shown in FIG. 4 may be also applied to the pass-through optical switching network 1101.

In the optical communication network node apparatus, an optical signal having any wavelength which is input to any optical fiber can be output to any output interface 113-1 to 113-*mn*, and an optical signal input to any input interface 114-1 to 114-*mn* can be output to any output terminal 1171 to 117*n* while converted to an optical signal having any wavelength. Further, an optical signal having any wavelength which is input to any input terminal 1111 to 111*n* can be output to any output terminal 1171 to 117*n* while converted to an optical signal having any wavelength. At this time, the pass-through optical switching network 1101 and the insert optical switching network 103 have the function of cutting off the output signals thereof, and the optical connection in the 2:1 optical connectors 151 to 15*n* can be performed while both the optical signals from both the optical switching networks are prevented from being input thereto (i.e., the wavelength blocking can be avoided).

In the case of the optical communication network node apparatus of the fourth embodiment, the wavelength demultiplexing units 881 to 88*n* and the 1:2 optical branch units 821-1 to 82*n*–*m* are used in the initial stage in place of the wavelength optical branch units of the optical branch units 121 to 12*n* used in the apparatus of the embodiment 1, and the wavelength demultiplexing units contained in the drop optical switching network 102 of the apparatus of the first embodiment are merely provided to the outside. Therefore, the number of optical switch elements can be reduced as in the case of the first embodiment.

Fifth Embodiment

Figure 12:
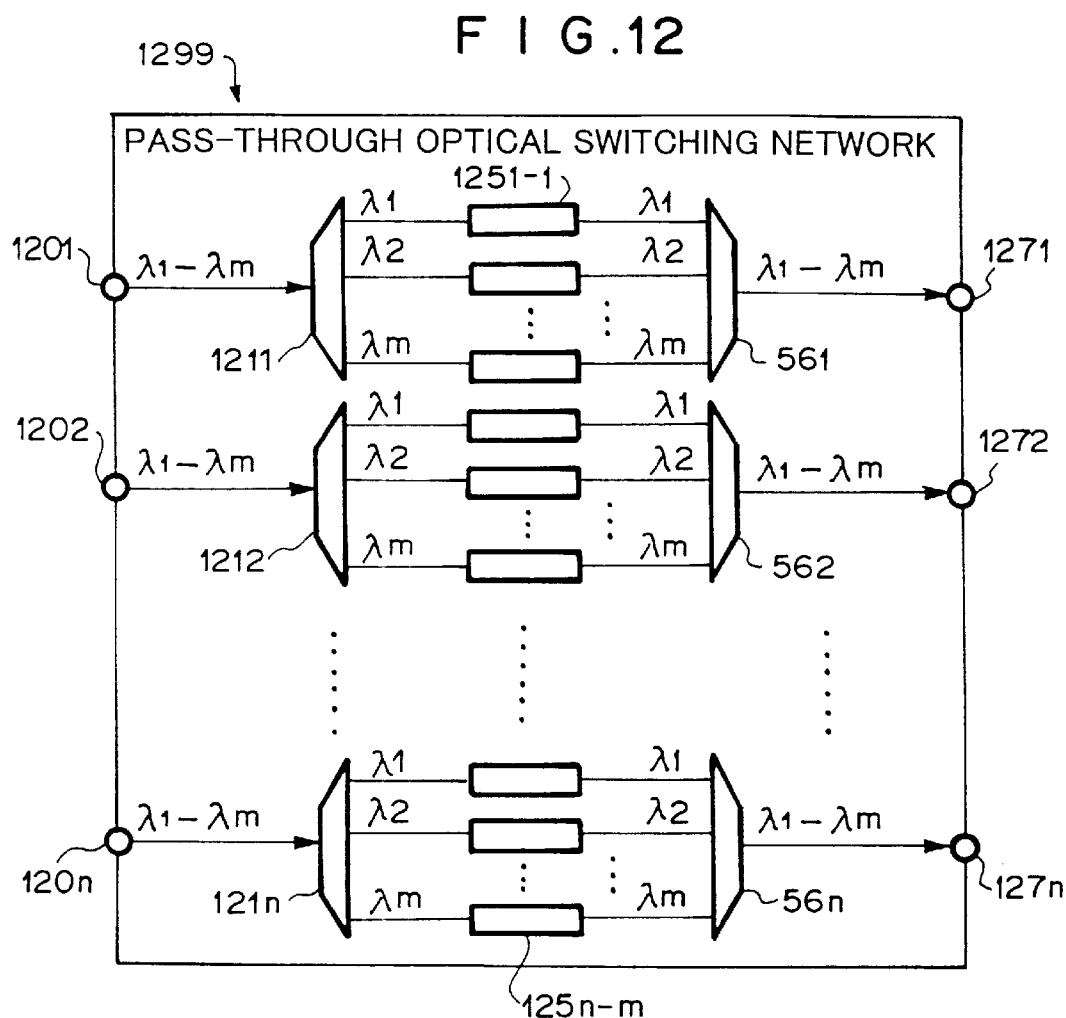
FIG. 12 is a diagram showing the detailed structure of another optical switching network for passage which is provided to the optical communication network node apparatus according to a fifth embodiment of the present invention.

FIG. 12 is a diagram showing the detailed structure of another pass-through optical switching network 1299 which is provided to an optical communication network node apparatus of a fifth embodiment of the present invention. This optical communication network node apparatus is designed by removing the pass-through optical switching network 101 in the apparatus of the first embodiment shown in FIG. 1 and providing a pass-through optical switching network 1299.

The pass-through optical switching network 1299 includes input terminals 1201 to 120*n*, wavelength demultiplexing units 1211 to 121*n*, optical gate switches 1251-*n* to 125*n*–*m*, wavelength multiplexers 561 to 56*n*, and output terminals 1271 to 127*n*, which are connected to one another in this order. The same structure as shown in FIG. 1 may be applied to each element.

Diffraction gratings or AWG (Array Waveguide Grating) may be used for the wavelength demultiplexing units 1211 to 121*n* and the wavelength multiplexers 561 to 56*n*. Each of the optical gate switches 1251 to 125*n*–*m* can perform a switching operation between output or non-output of light input thereto. A semiconductor optical amplifier may be used for each of the optical gate switches 1251-*n* to 125*n*–*m*. The ON/OFF operation of the output of the light can be performed by switching a turn on/off operation of supplying current to the semiconductor optical amplifier.

In the pass-through optical switching network 1299, the wavelength multiplexed light input to the input terminals 1201 to 120*n* is subjected to the wavelength demultiplex in the wavelength demultiplexing units 1211 to 121*n*, and then the optical signals having the respective wavelengths are input to the optical gate switches 1251-*n* to 125*n*–*m*. The outputs from the optical gate switches 1251-*m* to 125*n*–*m* are input to the wavelength multiplexers 561 to 56*n*, and the optical signals which are wavelength-multiplexed in these wavelength multiplexers are output to the output terminals 1271 to 127*n*.

Accordingly, the pass-through optical switching network 1299 cuts off only a desired wavelength from the wavelength-multiplexed input light, and then performs the wavelength multiplexing again to output the result to the output terminals 1271 to 127*n*. As is apparent from FIG. 12, the output terminals 1271 to 127*n* to which the input light is output are fixed, and has no spatial connection switching function.

The above-described optical communication network node apparatus cannot perform the spatial connection switching operation because the pass-through optical switching network 1299 is used. However, it can drop an optical signal having any wavelength of any input terminal 1201 to 120$n$, and also can insert an optical signal from another communication apparatus into an empty wavelength which is made empty due to the dropping. The drop operation of the optical signal is the same as the first embodiment.

When the optical signal is not dropped and is merely passed, the optical signal is passed through and output from the pass-through optical switching network 1299. At this time, the optical signal which is dropped in the apparatus is cut off by using the optical gate switches 1251-$n$ to 125$n$–$m$, thereby preventing the signal from being output from the pass-through optical switching network 1299. Further, optical signals other than the optical signal to be inserted from this apparatus are cut off by using the optical signal cut-off function of the insert optical switching network 103, thereby preventing these signals from being output from the insert optical switching network 103. Further, the optical signal to be inserted is inserted into an wavelength which is made empty due to the dropping. With this operation, the insert optical signal and pass-through optical signal can be transmitted to another node while combined with each other.

The optical communication network node apparatus of the fifth embodiment has only the switching function which is the required minimum level. Therefore, the number of the optical switch elements can be reduced as in the case of the apparatus of the first embodiment, and also the spatial switching of the optical signal to be passed is impossible, so that the optical communication network node can be constructed in low cost (the number of switches is reduced). In the case where the topology is a ring, the connection with the node is spatially limited to two directions (an optical signal input direction and an optical signal output direction). Therefore, it has an ON/OFF function of the optical signal to be passed. If the connection switching of the signal to be dropped, inserted is freely performed, the wavelength blocking between the insert optical signal and the pass-through optical signal can be avoided, and the communications among all the nodes can be performed even with no spatial connection switching of communication signals. In the case of a SONET ring, the communications of all the nodes can be implemented with only the spatial connection between two neighboring nodes as disclosed in the paper (Feasibility Study of a High-Speed SONET Self-Healing Ring Architecture in Further Interoffice Networks", IEEE Communi. Maga, vol. 28, no. 11, pp.33–42, 1990).

In the optical communication network node apparatus of the fifth embodiment, wavelength converters each having a gate function may be used in place of the optical gate switches 1251-1 to 125$n$–$m$, or an optical coupler may be used as each of the wavelength multiplexers 561 to 56$n$.

Sixth Embodiment

The optical communication network node apparatus of a sixth embodiment may be implemented by enabling the insert optical switching network and the pass-through optical switching network to cut off the output optical signals and also enabling the cut-off of the output of the wavelength converter.

According to the apparatus of this embodiment, if the output optical signals can be cut off as described above, the optical signals output from the output terminals can be combined without suffering the wavelength blocking. Therefore, the connection can be performed by the optical coupler unlike the apparatus of the second embodiment without using the 1×2 optical switch which is required to be used in the apparatus of the third embodiment and the apparatus of the fourth embodiment in which the selection of the output signal light of the pass-through optical switching network and the insert optical switching network is carried out by using the 1×2 optical switch.

Seventh Embodiment

Figure 13:
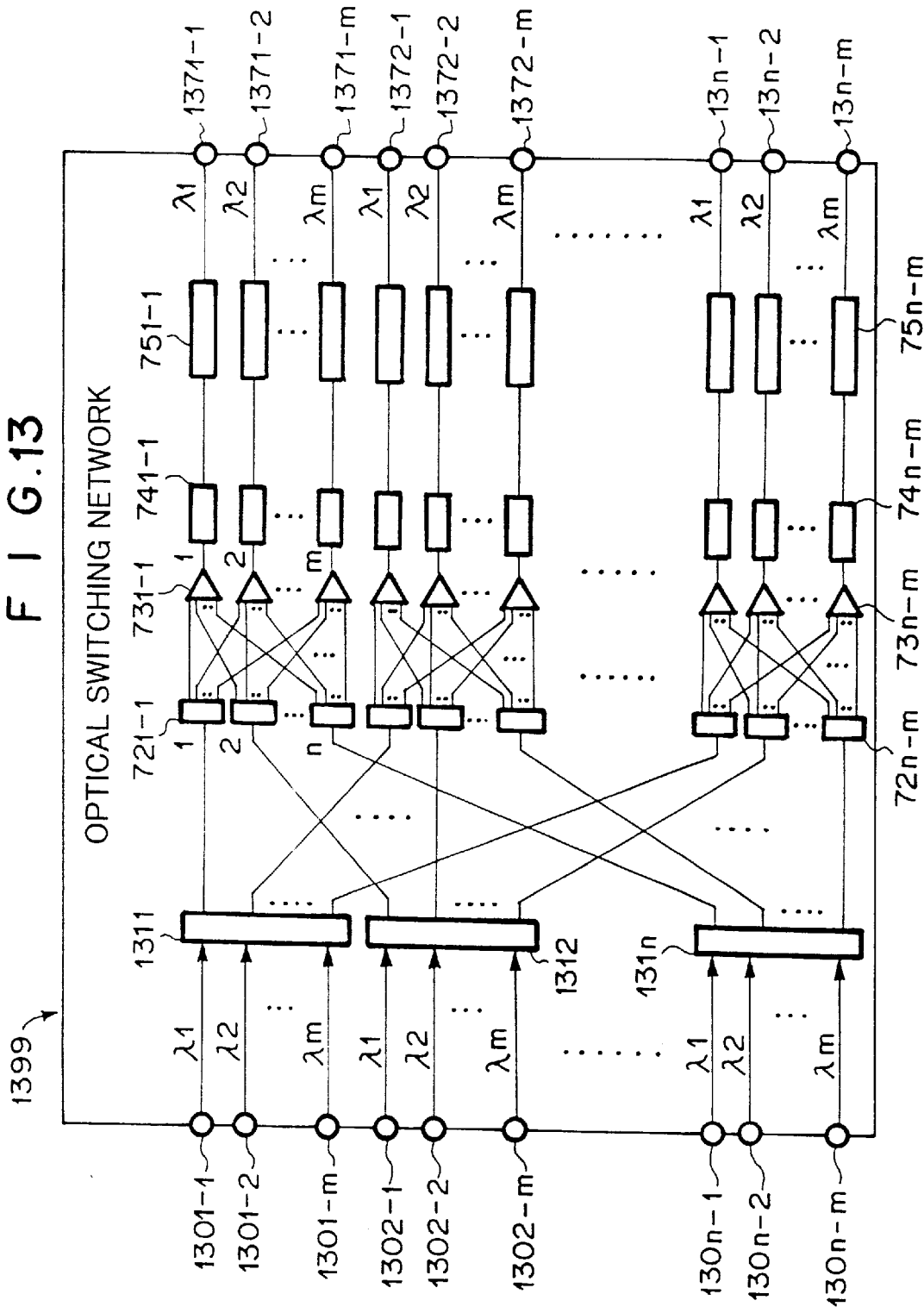
FIG. 13 is a diagram showing the detailed structure of another optical switching network which is provided to the optical communication network node according to a seventh embodiment of the present invention.

FIG. 13 is a diagram showing the detailed structure of another optical switching network 1399 provided to an optical communication network node apparatus of a seventh embodiment of the present invention.

The optical switching network 1399 is used as a substitute for the optical switching network 999 shown in FIG. 9, and it includes input terminals 1301-1 to 130$n$–$m$, star couplers 1311 to 131$n$, 1:m optical branch units 721-1 to 72$n$–$n$, n×1 optical selectors 731-1 to 73$n$–$m$, wavelength selection filters 741-1 to 74$n$–$m$, wavelength converters 751 to 75$n$ and output terminals 1371-1 to 137$n$–$m$, which are connected to one another in this order. The same as shown in FIG. 7 may be used for each of the above elements. The star couplers 1311 to 131n may constructed by twisting and fusing plural optical fibers. That is, the optical switching network 1399 uses the star couplers 1311 to 131$n$ in place of the wavelength multiplexers 781 to 78$n$ and the 1:n optical branch units 711 to 71$n$ which are used in the initial stage of the optical switching network 999 shown in FIG. 9. In this case, when larger one of m and n of the star couplers 1311 to 131$n$ is set as x, star couplers of the specification of x:x (x input x output) is used, and optical signals having different wavelengths are input from the input terminals 1301-1 to 130$n$–$m$ to the respective star couplers. Residual ports of the star couplers 1311 to 131$n$ are connected to nothing.

Since all the input signals which are wavelength-multiplexed are distributed to each of the star couplers 1311 to 131$n$ (because of the characteristics of the star couplers), each of the star couplers 1311 to 131$n$ can function both as the wavelength multiplexer and as the optical branch unit. In the subsequent operation, the optical signals are selected by the n:1 optical selectors 731-1 to 73$n$–$m$ and then selected by the wavelength selection filters 741-1 to 74$n$–$m$ as in the case of the structure shown in FIG. 9. Therefore, any optical signal can be output to the output terminals 1371-1 to 137$n$–$m$.

When an optical signal (one wave) which is not wavelength-multiplexed to the optical switching network 1399, it can be output while converted to an optical signal having any wavelength of any space. At this time, as in the case of the optical switching network 999 of FIG. 9, an optical signal of any input terminal 1301-1 to 130$n$–$m$ can be output to any output terminal 1371-1 to 137$n$–$m$ while the wavelength thereof is converted to any wavelength. Further, this optical switching network 1399 is designed to support the multicast, and any wavelength multiplexer and any 1:n optical branch unit which are required to the optical switching network 999 are not needed to this optical switching network 1399, so that the number of elements can be further reduced.

Eighth Embodiment

Figure 14:
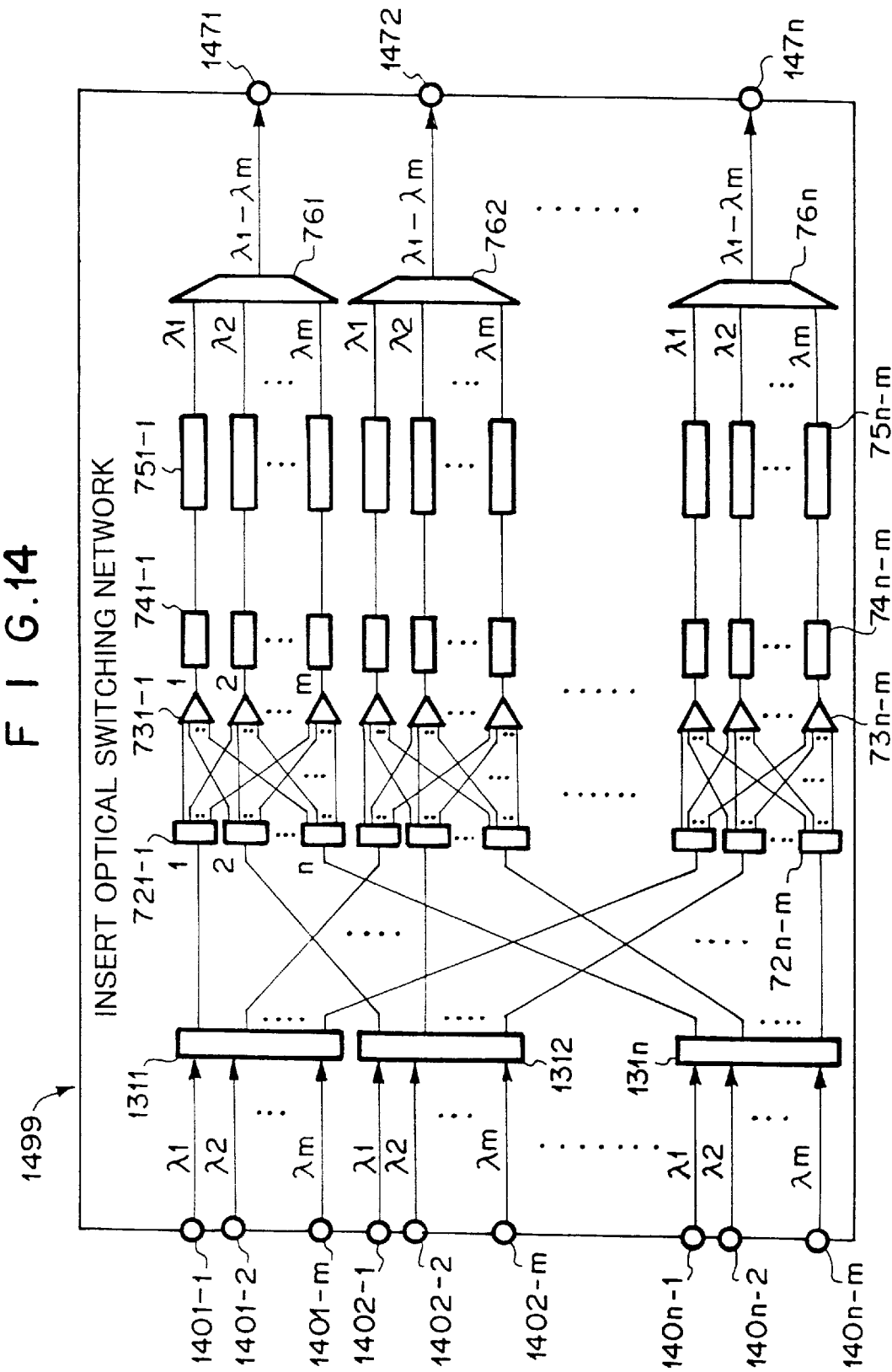
FIG. 14 is a diagram showing the detailed structure of another optical switching network which is provided to the optical communication network node apparatus according to an eighth embodiment of the present invention.

FIG. 14 is a diagram showing the detailed structure of another insert optical switching network 1499 which is provided to the optical communication network node apparatus according to an eighth embodiment of the present invention. The insert optical switching network 1499 is substituted for the insert optical switching network 799 shown in FIG. 7, and it includes input terminals 1401-1 to 140n-m, star couplers 1311 to 131n, 1:m optical branch units 721-1 to 72n-n, 2×1 optical selectors 731-1 to 73n-m, wavelength selection filters 741-1 to 74n-m, wavelength converters 751-1 to 75n-m, wavelength multiplexers 761 to 76n and output terminals 1471 to 147n, which are connected to one another in this order. The same structure as shown in FIG. 7 may be applicable to each element. The same structure as shown in FIG. 13 may be also applied to the star couplers 1311 to 131n.

In the insert optical switching network 1499, when an optical signal (one wave) which is not wavelength-multiplexed is input, an wavelength-multiplexed optical signal can be output. At this time, as in the case of the insert optical switching network 799 shown in FIG. 7, an optical signal having any input terminal 1401-1 to 140n-m can be output to any output terminal 1471 to 147n while the wavelength thereof is converted to any wavelength. Further, this insert optical switching network 1499 can also perform the multicast as in the case of the insert optical switching network 799 shown in FIG. 7, and the wavelength multiplexers and the 1:n optical branch units which are needed to the insert optical switching network 799 are not required to this optical switching network 1499, so that the number of elements can be further reduced.

Further Embodiments

In the optical communication network node apparatuses of the above-described embodiments, the matrix type optical switch and the optical switching network which is a modification of the parallel λ switch structure are applied as various optical switching networks (the pass-through optical switching network, the insert optical switching network, the drop optical switching network). However, the optical switching network of the present invention is not to the above embodiments, and any other switch structures may be applied solely or in combination. Further, the number of input/output terminals of the various optical switching networks is set to the same value, however, the number of the input/output terminals may be different among the optical switching networks. Still further, the number of optical signals to be input/output (m×n) is set to be equal to the number of optical signals to be dropped (the number of output interfaces) or the number of optical signals to be inserted (the number of input interfaces), however, these numbers may be different and set to be any value.

In addition, the multiplexing number of optical signals to be input to the input terminals and the multiplexing number of optical signals to be output to the output terminals are set to the same value, and the wavelength multiplexers and the wavelength demultiplexing units which have the same multiplexing number are used. However, the multiplexing number is not necessary set to the same value between the output terminals and between the input terminals.

Further, larger one of the wavelength multiplexing number and the number of optical fibers is used as the branch number of the star couplers (number of input terminals, number of output terminals) for the optical switching network. However, the branch number may be set to a further larger value.

The above embodiments are applied on the assumption of the m-wave multiplexed system, however the present invention may be implemented when the value of m is equal to 1 (in this case, the optical multiplexers and the optical demultiplexing units are unnecessary). In addition, the wavelength multiplexing technique is applied as the optical multiplexing technique, however, other multiplexing techniques such as a polarized-wave multiplexing, a time-multiplexing technique, etc. may be applied.

On the other hand, in each embodiment, the switching operation between the light output mode and the light non-output mode is performed by ON/OFF of the wavelength converter in order to provide the function of cutting off the specific output signal of the optical switching network. Such a function can be implemented by arranging the semiconductor optical amplifier at the rear stage of the wavelength selection filter to perform the gate operation. In place of the semiconductor optical amplifier, any element such as an erbium (Er)-based fiber type optical amplifier or the like which can perform the gate operation may be used.

Further, it may be implemented by performing ON/OFF of a laser driving portion of a light transmitter in the structure that an optical signal is received by a light receiver and a reception signal I input to the light transmitter. Further, the light output may be cut off by setting the selection wavelength of the wavelength selection filter to a value different from the wavelength of the optical signal.

With respect to the detailed structure of the above-described embodiments, the star coupler is constructed by twisting and fusing plural optical fibers, however, it may be implemented by combining plural optical branch units. An optical coupler is used as an optical connector, however, an optical switch for selectively connecting signal light to be inserted or signal light to be passed may be used.

In this case, the optical switch is switched without inducing wavelength blocking, and thus it is apparent that no optical signal output cut-off function is needed to each optical switching network. The branch ratio of light power of the optical branch unit and the connection ratio of the optical connector are not limited to the above disclosure if no problem occurs in light level design. An element using an electro-optical effect of $LiNbO_3$, is used as the optical switch, however, the optical switch of the present invention is not limited to this embodiment. Another type optical switch may be applied to obtain the same effect. For example, a mechanical type optical switch, an optical switch using an thermal optical effect, an optical switch using an acousto-optical effect, an optical gate switch using a semiconductor optical amplifier or the like may be used.

The wavelength converter is used in which an optical signal is temporarily received by a light receiver to be converted to an electrical signal and then converted to an optical signal having a desired wavelength. However, any structure may be used insofar as the wavelength of the optical signal is converted. For example, a semiconductor layer may be used as a wavelength converter to obtain the same effect, as is apparent from a paper (T. Shiragaki et al., "Optical Cross-connect System using Fixed-Wavelength Converters to Avoid Wavelength Blocking, "First Optoelectronics and Communications Conference (OECC '96) Technical Digest, PD1-5, pp.10–11, 1966. In this case, there can be provided the function of cutting off the output of the wavelength converter. This is because the gate switch operation can be performed by switching the mode in which no current is supplied and the mode in which current is supplied to oscillate the semiconductor laser. Further, as another style, the present invention can be implemented with a wavelength converter using a semiconductor optical amplifier based on mutual phase modulation, four optical wave mixing or the like (these reference papers (prior arts) are described in the "background of the Invention"). In all of these prior arts, the output light from the semiconductor optical amplifier is set as the output of the wavelength converter. Therefore, the semiconductor optical amplifier can perform the gate switching operation by switching the mode for inhibiting the current supply and the mode for allowing the current supply to provide a gain. With respect to the wavelength converter, even when the output wavelength may be set to be fixed or variable, the present invention can be implemented if no wavelength block occurs in the wave combining operation.

A structure disclosed in the paper (T.Shiragaki et al., "Optical Digital Cross-Connect System Using Photonic Switch Matrices and Optical Amplifiers", IEEE J. Lightwave Technol. Vol. 12, no. 8, pp1490–1496, 1994) has been known as the structure for performing the spatial connection switching for only the backup fiber. However, the present invention is clearly different from the above technique in object, structure and operation. The object of the structure of the above technique is to construct a backup route by changing the connection structure of the backup fiber, the optical switching network is connected to only the backup fiber, and the fiber is the switching unit thereof. The optical fiber being currently used is not input to the optical switching network, and it is directly connected to the electrical digital cross connect system.

Accordingly, the structure of the above paper has no function of freely setting the route of the optical signal being currently used. Further, the optical signal being currently used and the backup optical signal are not input to the same optical switching network, and the optical fiber being currently used and the optical switching network are connected to each other by the optical coupler. When the optical signal being currently used is perfectly cut off, there is no problem because only the output light from the optical switching network is received. However, when it is impossible to perfectly switch from the optical signal being currently used to the backup optical signal and thus the optical signal is weakened in the optical fiber being currently used, so that there occurs a failure in the state that light is slightly transmitted, the optical signal being currently used and the backup optical signal are mixed with each other, and thus the light receiver cannot receive the optical signal normally.

On the other hand, according to the present invention, the optical signal being currently used and the backup optical signal are handled while discriminated from each other, and connected to the same input/output terminal, so that the switching between any optical signal being currently used and any backup optical signal, the switching between optical signals being currently used and the switching between backup optical signals can be performed, and thus the dropping and the insertion of the optical signal being currently used and the backup optical signal can be performed. Accordingly, the route of the optical signal being currently used can be freely set, and the switching unit is set to an optical signal of one wave.

Further, the optical signal being currently used and the backup optical signal are input to the same optical switching network, and the switching operation therebetween is performed. Therefore, the optical signal being currently used and the backup optical signal are perfectly switched there between, and the present invention can support the failure occurring when the optical signal being currently used is slightly weakened as described with respect to the above paper.

Further, $N_w$, $N_s$ in the optical switching network and $N_W \times N_S$ optical switching network in the optical switching network which is connected to the electric digital cross connect system of FIG. 2 of the above paper represent the number of optical fibers being currently used and the number of backup optical fibers, and the optical switching network thereof serves as an interface for absorbing the difference between the number of optical fibers being currently used and the number of backup optical fibers. Therefore, they are not provided in order to drop and insert the optical signals.

The following is the difference in the operation. That is, the optical switching network described in the above paper does not aim to drop/insert an optical signal, but aims to restore the failure by changing the connection of the backup optical fiber, and thus it is used only when a backup route is constructed because of occurrence of a failure. On the other hand, the optical switching network of the present invention aims to drop/insert both the optical signal being currently used and the backup optical signal, so that it can be used not only at the time when a failure occurs, but also at the time when a normal communication is made. The conventional apparatus as described in the above paper has no function of convoluting the optical signals from two optical switching networks without inducing any wavelength blocking. However, in the present invention, the pass-through optical switching network and the insert optical switching network has the function of convoluting the output light from two optical switching networks without inducing any wavelength blocking, such as the function of cutting off any optical signal output, the function of selecting the optical signal from anything by the optical switch, etc. As described above, the present invention is clearly technically different from the above paper.

As described above, according to the optical communication network node apparatus of the present invention, the optical switching network is functionally divided into the pass-through optical switching network, the drop optical switching network and the insert optical switching network to support only the desired switching state. Therefore, it is unnecessary to construct the large-scale optical switching network by using only one optical switching network. Therefore, the number of optical switch elements required may be reduced, so that the miniaturization and the reduction in cost can be achieved.

Further, particularly when the drop optical switching network is connected to an optical signal monitoring device, the passed optical signal can be monitored at all times, and this is excellent in maintenance and management. Still further, no large-scale optical switching network is needed, and thus it is expected that the light loss may be reduced by using the plural small-scale optical switching networks.

Although the present invention has been shown and described with respect to best mode embodiments thereof, it should be understood by those skilled in the art that the foregoing and various other changes, omission, and additions in the form and detail thereof may be made therein without departing from the spirit and scope of the present invention.

What is claimed is:

1. An optical communication network apparatus comprising:
   plural optical branching means each having an input terminal and a first output terminal and a second output terminal;
   a first optical switching network, a second optical switching network;
   a third optical switching network;
   plural optical connecting means each having a first input terminal and a second input terminal and an output terminal;

a first group of plural input terminals;

a first group of plural output terminals;

a second group of plural input terminals; and a second group of plural output terminals, wherein the first group of input terminals are connected to the input terminals of the optical branching means, the first output terminals of the optical branching means are connected to the first optical switching network, the first optical switching network is connected to the first input terminals of the optical connecting means, the output terminals of the optical connecting means are connected to the first group of output terminals, the second output terminals of the optical branching means are connected to the second optical switching network, the second optical switching network is connected to the second group of output terminals, the second group of input terminals are connected to the third optical switching network, and the third optical switching network is connected to the second input terminals of the optical connecting means.

2. The optical communication network apparatus as claimed in claim 1, wherein said first optical switching network has a function of switching allowance or inhibition of passage of an optical signal input to the input terminal and has no spatial connection switching function.

3. The optical communication network apparatus as claimed in claim 1, wherein said first optical switching network and the third optical switching network can cut off the optical signal input to the input terminal.

4. An optical communication network apparatus comprising:

plural optical demultiplexing means;

plural optical branching means each having an input terminal and a first output terminal and a second output terminal;

a first optical switching network;

a second optical switching network;

a third optical switching network;

plural optical connecting means each having a first input terminal and a second input terminal and an output terminal;

plural optical multiplexing means;

a first group of plural input terminals;

a first group of plural output terminals;

a second group of plural input terminals; and a second group of plural output terminals, wherein the input terminals of the first group are connected to the optical demultiplexing means, the optical demultiplexing means are connected to the input terminals of the optical branching means, the first outputs of the optical branching mean are connected to the first optical switching network, the first optical switching network is connected to the first input terminals of the optical connecting means, the output terminals of the optical connecting means are connected to the optical multiplexing means, the optical multiplexing means are connected to the output terminals of the first group, the second output terminals of the optical branching means are connected to the second optical switching network, the second optical switching network is connected to the output terminals of the second group, the input terminals of the second group are connected to the third optical switching network, and the third optical switching network is connected to the second input terminals of the optical connecting means.

5. The optical communication network apparatus as claimed in claim 4, wherein said first optical switching network has a function of switching allowance or inhibition of passage of an optical signal input to the input terminal and has no spatial connection switching function.

6. The optical communication network apparatus as claimed in claim 4, wherein said first optical switching network and the third optical switching network can cut off the optical signal input to the input terminal.

7. An optical communication network apparatus comprising:

plural optical demultiplexing means;

plural optical branching means each having an input terminal and a first output terminal and a second output terminal;

a first optical switching network;

a second optical switching network;

a third optical switching network;

plural optical connecting means each having a first input terminal and a second input terminal and an output terminal;

a first group of plural input terminals;

a first group of plural output terminals;

a second group of plural input terminals; and a second group of plural output terminals, wherein the input terminals of the first group are connected to the optical demultiplexing means, the optical demultiplexing means are connected to the input terminals of the optical branching means, the first output terminals of the optical branching means are connected to the first optical switching network, the first optical switching network is connected to the first input terminals of the optical connecting means, the output terminals of the optical connecting means are connected to the output terminals of the first group, the second output terminals of the optical branching means are connected to the second optical switching network, the second optical switching network is connected to the output terminals of the second group, the input terminals of the second group are connected to the third optical switching network, and the third optical switching network is connected to the second input terminals of the optical connecting means.

8. The optical communication network apparatus as claimed in claim 7, wherein said first optical switching network has a function of switching allowance or inhibition of passage of an optical signal input to the input terminal and has no spatial connection switching function.

9. The optical communication network apparatus as claimed in claim 7, wherein said first optical switching network and the third optical switching network can cut off the optical signal input to the input terminal.

10. An optical communication network apparatus comprising:

plural optical branching means each having an input terminal and a first output terminal and a second output terminal;

a first optical switching network;

a second optical switching network;

a third optical switching network;

plural optical connecting means each having a first input terminal and a second input terminal and an output terminal;

plural optical multiplexing means;

a first group of plural input terminals;

a first group of plural output terminals;

a second group of plural input terminals; and a second group of plural output terminals, wherein the input terminals of the first group are connected to the input terminals of the optical branching means, the first output terminals of the optical branching means are connected to the first optical switching network, the first optical switching network is connected to the first input terminals of the optical connecting means, the output terminals of the optical connecting means are connected to the optical multiplexing means, the optical multiplexing means are connected to the output terminals of the first group, the second output terminals of the optical branching means are connected to the second optical switching network, the second optical switching network is connected to the output terminals of the second group, the input terminals of the second group are connected to the third optical switching network, and the third optical switching network is connected to the second input terminals of the optical connecting means.

11. The optical communication network apparatus as claimed in claim 10, wherein said first optical switching network has a function of switching allowance or inhibition of passage of an optical signal input to the input terminal and has no spatial connection switching function.

12. The optical communication network apparatus as claimed in claim 10, wherein said first optical switching network and the third optical switching network can cut off the optical signal input to the input terminal.

* * * * *